(12) United States Patent
Sahli et al.

(10) Patent No.: US 11,071,308 B2
(45) Date of Patent: Jul. 27, 2021

(54) METHOD FOR GENERATING A COFFEE BEVERAGE IN A BREWING DEVICE OF AN AUTOMATIC COFFEE MACHINE AND AUTOMATIC COFFEE MACHINE FOR IMPLEMENTING THE METHOD

(71) Applicant: JURA Elektroapparate AG, Niederbuchsiten (CH)

(72) Inventors: Georg Sahli, Ersigen (CH); Stephan Probst, Lohn-Ammannsegg (CH); Philipp Buettiker, Oberbuchsiten (CH); Reinhard Studer, Oberbuchsiten (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 410 days.

(21) Appl. No.: 15/744,906

(22) PCT Filed: Sep. 23, 2016

(86) PCT No.: PCT/EP2016/072693
§ 371 (c)(1),
(2) Date: Jan. 15, 2018

(87) PCT Pub. No.: WO2017/050968
PCT Pub. Date: Mar. 30, 2017

(65) Prior Publication Data
US 2018/0206668 A1    Jul. 26, 2018

(30) Foreign Application Priority Data

Sep. 24, 2015    (EP) ..................... 15405057

(51) Int. Cl.
*A23F 5/26*    (2006.01)
*A47J 31/057*    (2006.01)
*A47J 31/46*    (2006.01)
*A47J 31/52*    (2006.01)
*A47J 31/34*    (2006.01)
*A47J 31/42*    (2006.01)

(52) U.S. Cl.
CPC ............. *A23F 5/26* (2013.01); *A47J 31/0576* (2013.01); *A47J 31/34* (2013.01); *A47J 31/42* (2013.01);
(Continued)

(58) Field of Classification Search
CPC ....... A23F 5/26; A47J 31/469; A47J 31/5251; A47J 31/5255; A47J 31/34; A47J 31/42;
(Continued)

(56) References Cited

U.S. PATENT DOCUMENTS

| 4,767,632 A | 8/1988 | Meier |
| 6,095,031 A | 8/2000 | Warne |

(Continued)

FOREIGN PATENT DOCUMENTS

| EP | 0 245 197 A2 | 11/1987 |
| EP | 1 955 624 B1 | 8/2008 |

(Continued)

OTHER PUBLICATIONS

International Search Report of PCT/EP2016/072693, dated Nov. 18, 2016.
(Continued)

*Primary Examiner* — Sally A Merkling
(74) *Attorney, Agent, or Firm* — Collard & Roe, P.C.

(57) ABSTRACT

A method for generating a coffee beverage in an automatic coffee machine brewing device supplies pressurized brewing water at a brewing device brewing water inlet according to a first brewing water supply mode during a first time period. During a second time period, a brewing water parameter is determined correlating with the volume flow and/or pressure of the supplied brewing water. A mode adjustment variable is set for a second brewing water supply mode using the brewing water parameter. Brewing water is supplied at the brewing water inlet during the second time (Continued)

period according to the second brewing water supply mode. The mode adjustment variable defines at least one continuous mode for the second brewing water supply mode, in which the brewing water is continuously supplied, and a pulse mode for the second brewing water supply mode, in which the brewing water is supplied in pulses.

12 Claims, 11 Drawing Sheets

(52) U.S. Cl.
CPC ............ *A47J 31/467* (2013.01); *A47J 31/469* (2018.08); *A47J 31/52* (2013.01); *A47J 31/5251* (2018.08); *A47J 31/5255* (2018.08)

(58) Field of Classification Search
CPC ...... A47J 31/0576; A47J 31/467; A47J 31/52; A47J 31/057
See application file for complete search history.

(56) References Cited

U.S. PATENT DOCUMENTS

| | | |
|---|---|---|
| 8,833,237 B2 | 9/2014 | Gussmann et al. |
| 9,351,601 B2 | 5/2016 | Buettiker |
| 2005/0166765 A1* | 8/2005 | Lyall, III ............ A47J 31/0576 99/280 |
| 2014/0314921 A1* | 10/2014 | Kuempel ............ A47J 31/5255 426/231 |

FOREIGN PATENT DOCUMENTS

| | | |
|---|---|---|
| EP | 2 213 957 A2 | 8/2010 |
| EP | 2 570 056 A1 | 3/2013 |

OTHER PUBLICATIONS

English translation of the Written Opinion of the International Searching Authority in PCT/EP2016/072693, dated Nov. 18, 2016.

* cited by examiner

METHOD FOR GENERATING A COFFEE BEVERAGE IN A BREWING DEVICE OF AN AUTOMATIC COFFEE MACHINE AND AUTOMATIC COFFEE MACHINE FOR IMPLEMENTING THE METHOD

CROSS REFERENCE TO RELATED APPLICATIONS

This application is the National Stage of PCT/EP2016/072693 filed on Sep. 23, 2016, which claims priority under 35 U.S.C. § 119 of European Application No. 15405057.9 filed on Sep. 24, 2015, the disclosure of which is incorporated by reference. The international application under PCT article 21(2) was not published in English.

BACKGROUND OF THE INVENTION

1. Field of the Invention

The invention at hand relates to a method for generating a coffee beverage in a brewing device of an automatic coffee machine and to an automatic coffee machine for implementing the method for generating a coffee beverage in a brewing device.

The invention in particular relates to a method, in which the brewing water is supplied in pulses to a brewing chamber of the brewing device as a function of a brewing water parameter.

2. Description of the Related Art

Methods for generating coffee beverages are known, in the case of which the brewing water pump of an automatic coffee machine, which is equipped to implement such common methods, is controlled by means of electrical pulses. Such a method is known for example from the European patent application EP 2 570 056 A1. A brewing chamber of the automatic coffee machine is equipped with a créma valve, which is pretensioned mechanically by means of a spring and which closes the outlet of the brewing chamber in the normal state. Brewing water can be introduced into the brewing chamber, which is filled with coffee powder, at a pressure of 5 bar or more. When a certain pressure inside the brewing chamber is exceeded, this overpressure also acts on the créma valve. The latter is pushed against the direction of the pretensioning force of the spring and thus releases a passage gap.

To build up the necessary brewing chamber pressure, a brewing water pump is used in EP 2 570 056 A1, for example a reciprocating plunger type pump. This brewing water pump can be controlled specifically with a pulse-modulated signal. A switch-over between the pump standstill and the full active operation of the pump is hereby made repeatedly in quick succession. As further follows from EP 2 570 056 A1, this pulsed operation of the brewing water pump serves the purpose of reducing the effective delivery rate of the brewing water pump, in order to prevent an abrupt opening of the créma valve. The pulsed operation, which is known from EP 2 570 056 A1, thus takes place according to the principle of a temporal pulse modulation, in order to throttle the pump capacity. Provision is made in the method known from EP 2 570 056 A1 for the brewing water to always be supplied with volume flows, which vary over time, during a brewing process. At least for one of these volume flows, which is smaller than the maximum delivery rate of the brewing water pump; provision is thus made in every brewing process at least during a partial time period for the brewing water pump to be controlled in a temporal pulse-modulated manner, in order to throttle the pump capacity to this lower volume flow.

Moreover, European patent application EP 2 213 957 A2 is directed to a heating system for a device for preparing hot beverages, wherein the heating system has a pump, among other things. EP 2 213 957 A2 also assumes a functional connection, for example a linear connection, between the delivery quantity of the pump and the capacity supplied to it. Based on this functional connection, the solution known from EP 2 213 957 A2 provides, among other things, for the pump to additionally act as indirect flow meter. An additionally provided separate flow meter serves the purpose of monitoring the function of the pump, thus, e.g., to detect a failure of the pump.

European patent EP 1 955 624 B1 discloses a coffee machine, which can react to variable degrees of grinding of ground coffee. It has been recognized in publication EP 1 955 624 B1 that the flow rate through the ground coffee can have an impact on the taste of the prepared coffee beverage, and the known coffee machine thus has a flow meter. In EP 1 955 624 B1, the flow volume detected therewith during a preparation process or a variable deduced therefrom, respectively, is output only informatively to an operator of the coffee machine. The operator can set the degree of grinding of the coffee beans by means of the displayed data, wherein EP 1 955 624 B1 points out at the same time that there is a risk of clogging of the brewing device in the case of a setting of the degree of grinding, which is too fine.

A method for preparing coffee is known from European patent application EP 0 245 197 A2, wherein an automatically adjustable grinding unit is used to grind the coffee beans and to fill a brewing chamber of the machine. A specified amount of brewing water is introduced into the brewing chamber, and the throughput time of the certain amount through the coffee powder is measured. The degree of grinding of the grinding unit is adjusted automatically by means of a comparison with a target throughput time.

The degree of grinding of the ground material, thus on principle the degree of grinding of the ground coffee, may have an impact on the gustatory properties of the generated coffee beverage. Above all, it is possible for the optimal range of the degree of grinding to vary in the case of different types of coffee beverages. One thus often aims at processing the coffee beans into rather fine ground coffee (fine degree of grinding) in the case of an espresso, while a coarser degree of grinding is preferable, e.g. in the case of a coffee of an American type of preparation.

Typically, a rather fine degree of grinding is assumed, when a grain size (particle size) of more than 500 µm with a grain content of less than 25% by weight is present in the ground material. Analogously, a rather coarse degree of grinding is assumed, when a grain size of more than 500 µm with a grain content of 25% by weight or more is present in the ground material. This information, however, is to only be understood in an exemplary manner and not as being limiting.

To obtain an optimal taste result, a grinding of the ground material, which is as fine as possible, may be favorable.

The known methods and devices have the disadvantage that the water pressure, which is required for passing through this coffee powder, becomes very large, in particular in the case of very fine grinding of the coffee powder, which is located in the brewing chamber during the brewing process. On the one hand, this may be undesirable, because the quality of the prepared coffee beverage can thus decrease; for example the taste-related or other impairments may result, when the brewing pressure is too high.

On the other hand, however, it is also possible for the maximum pump pressure, which is to be applied by the brewing water pump, to not be sufficient to pass through such finely ground and thus tightly pressable coffee powder at all. Common automatic coffee machines are known, which perform a monitoring of the pump pressure and/or a flow monitoring of the brewing water. If such common automatic coffee machines determine that the pump pressure rises above a threshold value or that a minimum flow volume of brewing water is fallen below, respectively, they terminate the brewing process and eject the ground and pressed ground coffee into a disposal container, if applicable.

SUMMARY OF THE INVENTION

The invention at hand is based on the object of avoiding the mentioned disadvantages and to in particular specify a method for generating a coffee beverage in a brewing device or an automatic coffee machine for implementing the method, by means of which a high quality of a coffee beverage obtained by the brewing processes can in each case be achieved, namely at very different degrees of grinding of the ground material.

This object is solved by means of a method comprising the features of one aspect of the invention or by means of an automatic coffee machine comprising the features of patent claim 8 another aspect of the invention, respectively.

The brewing device of an automatic coffee machine for implementing the method according to the invention has a brewing chamber for accommodating ground material. The ground material is in particular ground coffee, which is automatically supplied to the brewing chamber by a grinder, for example in the case of a fully automatic coffee machine. The brewing chamber has a brewing water inlet, to which brewing water can be supplied. The brewing chamber further has a chamber outlet, from which the extraction liquid escapes, which is generated by the brewing water running through the brewing chamber, which is filed with the ground material.

The method according to the invention thereby has a method step, in which pressurized brewing water is supplied to the brewing water inlet during a first supply time period, namely according to a first brewing water supply mode, in which the brewing water is continuously supplied to the brewing water inlet. The method also has the following further method steps, which are performed during a second supply time period:

determining a brewing water parameter, which correlates with the volume flow and/or with the pressure of the brewing water supplied to the brewing water inlet, and setting a mode setting parameter for a second brewing water supply mode, by using the brewing water parameter;

supplying brewing water to the brewing water inlet according to the second brewing water supply mode.

The mode setting parameter defines at least one continuous mode for the second brewing water supply mode and a pulse mode for the second brewing water supply mode, wherein the brewing water is continuously supplied to the brewing water inlet in the continuous mode for the second brewing water supply mode, and wherein the brewing water is supplied to the brewing water inlet in pulses in the pulse mode for the second brewing water supply mode. The setting of the mode setting parameter for the second brewing water supply mode comprises at least one selection between the continuous mode for the second brewing water supply mode and the pulse mode for the second brewing water supply mode. This selection is made as a function of the brewing water parameter.

According to the invention, the at least one selection between the continuous mode for the second brewing water supply mode and the pulse mode for the second brewing water supply mode comprises at least one of the following steps:

measuring a pressure of the brewing water supplied to the brewing water inlet at the brewing water inlet and selecting the pulse mode or the continuous mode for the second brewing water supply mode as a function of the measured pressure, wherein the pulse mode is selected, when the measured pressure at the brewing water inlet exceeds a predetermined or predeterminable pressure threshold value, and the continuous mode is selected, when the measured pressure at the brewing water inlet falls below a predetermined or predeterminable pressure threshold value; and/or measuring a volume flow of the brewing water supplied to the brewing water inlet and/or of a volume flow of a liquid, which escapes from the chamber outlet, and selecting the pulse mode or the continuous mode for the second brewing water supply mode as a function of the measured volume flow of the brewing water supplied to the brewing chamber inlet and/or the measured volume flow of the liquid, which escapes from the chamber outlet, wherein the pulse mode is selected, when the measured volume flow of the brewing water supplied to the brewing chamber inlet and/or the measured volume flow of the liquid, which escapes from the chamber outlet, falls below or fall below, respectively, a predetermined or predeterminable volume flow threshold value, and the continuous mode is selected, when the measured volume flow of the brewing water supplied to the brewing water inlet and/or the measured volume flow of the liquid, which escapes from the chamber outlet, exceeds or exceed, respectively, a predetermined or predeterminable volume flow threshold value.

It goes without saying that the second brewing water supply mode is implemented according to the setting of the mode setting parameter.

In this context, "volume flow of the conveyed or supplied brewing water, respectively", identifies the amount of brewing water per time unit, which is in each case conveyed or supplied, respectively, within a predetermined time unit.

As a function of the determined brewing water parameter, which correlates with the volume flow and/or with the pressure of the conveyed brewing water, it is thus determined in the case of the method according to the invention, whether the supply of brewing water according to the second brewing water supply mode is at least temporarily implemented in the pulse mode.

As a function of at least one determined measuring value (for example for a pressure of the brewing water at the brewing water inlet, which brewing water being supplied to the brewing water inlet, for a volume flow of the brewing water supplied to the brewing water inlet, and/or a volume flow of a liquid, which escapes from the chamber outlet), it is in particular determined, whether the supply of brewing water according to the second brewing water supply mode is at least temporarily implemented in the pulse mode. This makes it possible to control the supply of the brewing water during the generation of a coffee beverage in the brewing chamber as a function of the respectively determined measuring values (for example automatically by means of a corresponding control unit of the automatic coffee machine) and to vary it suitably with regard to different conditions when brewing coffee beverages (by means of the respective selection of the continuous mode or of the pulse mode for the second brewing water supply mode).

In the case of the method according to the invention, the second supply time period follows the first supply time period. In addition, the method described herein in each case also refers to one generating process (brewing process) of the coffee beverage, i.e. the method is implemented while a respective beverage is obtained. This does not exclude that further steps can be performed for the final preparation of the coffee beverage, for example a step, in which ground coffee is generated by grinding, ground coffee is introduced and/or pressed into the brewing chamber, and the like. It goes without saying that it is also possible that the method is implemented differently in the case of different brewing processes, for example in the case of consecutive brewing processes in a fully automatic coffee machine, e.g. by means of different method parameters.

A pulse mode of a liquid transport, for example a brewing water supply, is understood to be a mode, in which the liquid is transported in intervals, thus a supply takes place in pulses. Such a liquid transport in intervals can be attained, for example, in that a pump, which is used for conveying the liquid, is alternately turned on and off, is thus operated cyclically. In the pulse mode of the liquid transport, the pulses are embodied in such a way that the conveyed liquid exerts a thrust on the ground material located in the brewing chamber and/or sets the ground material located in the brewing chamber into a certain oscillation. The supply pauses of the pulses are thus in particular sufficiently long to briefly interrupt the liquid transport. For example, supply pauses of more than 0.05 seconds or of more than 0.1 seconds are sufficiently long. In the context of the invention described herein, a supply in pulses is furthermore understood in such a way that the pulse mode has a certain minimum number of pulses, for example more than three pulses or more than five pulses.

A continuous mode for the second brewing water supply mode is understood to be a mode, in which the brewing water is supplied in a non-pulsed manner. A non-pulsed supplying, thus a continuous supply operation or continuous wave operation, respectively, differs from the above-described pulse mode in that no or only very slight pulse-like thrusts are exerted according to the above-mentioned minimum number of pulses, on the ground material in the brewing chamber by means of the brewing water supplied to the brewing water inlet. In the context of this invention, such a mode is in particular also considered to be a continuous mode, in the case of which a pump, which serves to supply the brewing water, is controlled in a throttled mode, in the case of which comparatively quick electrical pulses are used in the context of a pulse width modulation pump control. In the case of such quick electrical pulses, the frequency is typically 50 Hz or higher. Due to the inertia of the pump, the operation thereof is not interrupted in the case of such quick pulses. In fact, the conveyed volume flow is throttled in response to a largely continuous conveying, without noteworthy thrusts being exerted on the ground material.

Surprisingly, it was found that, by means of at least temporarily supplying the brewing water in pulses in the second brewing water supply mode, a high-quality coffee beverage can then also be obtained, when the ground material has a fine degree of grinding. A sufficiently small pressure can be attained at the brewing water inlet and/or a sufficiently large volume flow through the brewing chamber even in the case of a very fine degree of grinding, in particular by means of the at least temporary supply in pulses. This may even apply, when the degree of grinding of the ground material is so fine that the capacity of the brewing water pump would not be sufficient to build up a pressure, which is required for the brewing water to pass through the brewing chamber, during a continuous operation (continuous wave operation) of a brewing water pump, which is used for the brewing water supply.

According to a further aspect of the invention, provision is made for the method steps, which are performed during the second supply time period, to be performed repeatedly. According to this aspect, the following is thus performed repeatedly in a loop:

determining a brewing water parameter, which correlates with the volume flow and/or with the pressure of the conveyed brewing water, and setting a mode setting parameter for a second brewing water supply mode, by using the brewing water parameter; and supplying brewing water to the brewing water inlet (35) according to the second brewing water supply mode.

When repeatedly performing the method steps, the brewing water parameter is for example determined continuously or in predetermined or predeterminable intervals. The setting of the mode setting parameter for the second brewing water supply mode is then a changing of the mode setting parameter by using the brewing water parameter or as a function of the brewing water parameter, respectively. This changing of the mode setting parameter also takes place continuously, e.g., or in predetermined or predeterminable intervals. Provision may be made for a suitable delay between the setting of the mode parameter and a renewed determination of the brewing water parameter, thus prior to a renewed loop run.

When repeatedly performing the mentioned method steps, however, the supply of brewing water in the second brewing water supply mode also preferably takes place continuously, thus without interruption of the brewing process. If the mode setting parameter for the second brewing water supply mode is changed at a certain point in time, the second brewing water supply mode is accordingly also continued according to the changed mode setting parameter.

Provision may furthermore be made for a suitable criterion, in response to the presence of which the repeated performance of the mentioned method steps is ended, e.g. an abort criterion for the delivery of coffee.

According to a further aspect of the invention, provision is made for the setting of the mode setting parameter for the second brewing water supply mode to comprise a switch-over between the continuous mode for the second brewing water supply mode and the pulse mode for the second brewing water supply mode as a function of the brewing water parameter, i.e. the switch-over between the continuous mode for the second brewing water supply mode and the pulse mode for the second brewing water supply mode in particular occurs as a function of the measured pressure of the brewing water supplied to the brewing water inlet and/or the measured volume flow of the brewing water supplied to the brewing chamber inlet and/or the measured volume flow of the liquid, which escapes from the chamber outlet.

Such a switch-over can in particular be considered when the above-mentioned method steps are performed repeatedly, thus when the brewing water parameter is determined repeatedly during a brewing process. According to this aspect, provision is thus made for a switch-over to be made between the pulse mode and the continuous mode, depending on which current properties of the brewing water parameter were determined.

According to an aspect of the invention, provision may be made for a measured volume flow of the brewing water supplied at the brewing water inlet to be included in the brewing water parameter. In the simplest case, the brewing water parameter itself is the measured volume flow of the supplied brewing water to the brewing chamber inlet. The definition of the mode setting parameter for the second brewing water supply mode then takes place by using the measured volume flow or as a function of the measured volume flow, respectively, of the brewing water supplied to the brewing chamber inlet. A low measured volume flow of the brewing water supplied at the brewing chamber inlet may suggest a difficult passage of the brewing water through the ground material inside the brewing chamber, which is caused for example by a fine degree of grinding.

According to an aspect of the invention, provision may be made for a measured volume flow of the brewing water, which escapes from the chamber outlet, to be included in the brewing water parameter. In the simplest case, in turn, the brewing water parameter itself is the measured volume flow of the brewing water, which escapes from the chamber outlet. The definition of the mode setting parameter for the second brewing water supply mode then takes place by using the measured volume flow of the brewing water, which escapes from the chamber outlet or as a function of the measured volume flow, respectively, of the brewing water, which escapes from the chamber outlet. It also applies here that a low measured volume flow of the brewing water, which escapes from the chamber outlet, suggests a difficult passage of the brewing water through the ground material inside the brewing chamber, which is caused for example by a fine degree of grinding.

According to an aspect of the invention, provision may be may for a measured pressure at the brewing water inlet to be included in the brewing water parameter. In the simplest case, in turn, the brewing water parameter itself is the measured pressure at the brewing water inlet. The mode setting parameter for the second brewing water supply mode then takes place by using the measured pressure at the brewing water inlet or as a function of the measured pressure, respectively, at the brewing water inlet. With regard to the measured pressure, it applies that a high pressure may suggest a difficult passage of the brewing water through the ground material inside the brewing chamber, which, in turn, is caused for example by a fine degree of grinding.

The presence of a fine degree of grinding can thus be detected by means of the mentioned parameters, which can be included in the brewing water parameter, either alone or also in combination. This can then be at least partially compensated by means of suitably setting the mode setting parameter.

The method according to the invention can be used in a fully automatic coffee machine, as will be described further below. Such a fully automatic coffee machine is equipped with a grinder, which processes roasted coffee beans to a ready for use ground material of ground coffee. It is conceivable hereby that the grinder is embodied so that the degree of grinding thereof can be adjusted manually or can be adjusted automatically.

An automatic adjusting of the degree of grinding may in particular be advantageous, when the fully automatic coffee machine allows a selection for the prepared coffee beverage. Examples for selectable coffee beverages are coffee, espresso, ristretto, cappuccino, latte macchiato. The selection, however, is not limited to the mentioned examples. For the preparation of an American coffee, the machine can convert the automatically adjustable grinder to a coarser grinding, e.g., while a finer grinding is set, e.g. when selecting an espresso.

The degree of grinding of the ground material can be deduced, e.g., from the setting of the degree of grinding of the automatically or manually adjustable grinder. According to a further aspect of the invention, provision is now made for the set degree of grinding of the ground material to be included in the brewing water parameter. In the alternative or in addition, provision may also be made for the set type of coffee beverage to be included in the brewing water parameter, thus the selected setting for the coffee beverage, which is to be prepared.

This additional information with regard to the measured volume flow and/or with regard to the measured volume, thus the degree of grinding or the set type of coffee beverage, respectively, may contribute to setting the mode setting parameter more advantageously.

For example in the case of a certain set degree of grinding (e.g. in the case of a finely set degree of grinding), a pulse mode, which is well suited for such a degree of grinding, can thus be set right at the start of the second supply time period. By including the measured values (volume flow and/or pressure), the setting can be adapted to the conditions, which actually prevail in the brewing chamber, in particular in response to a repeated performance of the corresponding method steps.

In the case of a certain set type of coffee beverage, e.g., a pressure, which is higher, and/or a volume flow, which is lower than in the case of a different type of coffee beverage, before the pulse mode is set, can be permitted in a similar way.

In an advantageous further development, the mode setting parameter in the case of the method according to the invention additionally defines pulse properties for the second brewing water supply mode, which include a pulse duty factor or a course of time of the pulse duty factor. According to this aspect, the setting of the mode setting parameter has a setting of the pulse properties for the pulse mode.

The pulse duty factor is understood to be the temporal relationship of the on-time to the off-time of the brewing water supply during the period duration, thus for example the temporal relationship of the on-time to the off-time of a pump for the brewing water supply. According to this aspect, the pulse duty factor is thus set as a function of the brewing water parameter. Provision may be made, for example, for a pulse duty factor to be set, in the case of which the on-time and the off-time are approximately identical during the period duration, when the brewing water parameter suggests a fine degree of grinding. When the brewing water parameter suggests a coarser degree of grinding, a pulse duty factor can then be set similarly, in the case, of which the on-time is longer than the off-time. It is also possible, however, to specify a progressive or a degressive course of time of the pulse duty factor in the case of a constant period duration.

A typical period duration lies in the range of between approx. 0.1 s and approx. 4 s. These values, however, are exemplary and should not be understood to be limiting.

In addition to a variation of the pulse duty factor itself, the course of time of the pulse duty factor also includes a variation of the period duration over the course of time. A variability not only of the pulse duty factor per se, but also of the on-time during the pulses and/or the pause duration between the individual pulses can be attained thereby.

Provision may thus be made for the period duration to be changed in such a way that a progressive or a degressive course of time of the on-times of the pulses results. It is also possible to initially provide a progressive course of the on-times of the pulses, when is then followed by a degressive course of the on-times of the pulses. Likewise, it is also possible to initially provide for a degressive course of the on-times of the pulses, which is then followed by a progressive course of the on-time of the pulses.

Analogously, it is possible for the period duration to be changed in such a way that a progressive or a degressive course of time of the pause durations of the pulses results. It is also possible to initially provide a progressive course of the pause durations of the pulses, which is then followed by a degressive course of the pause durations of the pulses. It is likewise also possible to initially provide a degressive course of the pause durations, which is then followed by a progressive course of the pause durations.

According to an advantageous further development of the invention, provision is made for a switch-over to take place once or several times between the continuous mode and the pulse mode as a function of the brewing water parameter. Additional pulse properties for the pulse mode can, in turn, be defined by the mode setting parameter, as described above. It is conceivable, in turn, for the additional pulse properties to be changed prior to switching over into the pulse mode, e.g. when the pulse mode had already been selected during a brewing process, when a switch-over into the continuous mode had already taken place subsequently, and when a switch-back into the pulse mode with changed pulse properties then takes place. In the alternative or in addition, it is possible for the additional pulse properties to be changed, while the second brewing water supply mode is performed in the pulse mode, as already described above. A changing of the additional pulse properties, in turn, can comprise progressive and/or degressive courses of time of the pulse duty factor, of the pulse pause duration and/or of the pulse on-time.

According to an aspect of the invention, provision may be made for the setting of the mode setting parameter comprising the following:

selecting the pulse mode for the second brewing water supply mode, when the pressure at the brewing water inlet exceeds a predetermined or predeterminable pressure threshold value and/or when the volume flow of the supplied brewing water at the brewing chamber inlet and/or the volume flow of the liquid, which escapes from the chamber outlet, falls or fall below, respectively, a predetermined or predeterminable volume flow threshold value.

According to this aspect of the invention, the pulse mode for the second brewing water supply'mode is thus selected, when the determination of the brewing water parameter shows that the pressure at the brewing water inlet exceeds a threshold value for the pressure; according to this aspect of the invention, the pulse mode for the second brewing water supply mode is selected, in the alternative or in addition, when the determination of the brewing water parameter shows that the volume flow of the supplied brewing water at the brewing chamber inlet and/or the volume flow of the liquid, which escapes from the chamber outlet, falls below a threshold value for the volume flow. A pressure, which is above a threshold value, as well as volume flows, which are below a threshold value, may suggest that the brewing process can be carried out better, when the pulse mode is selected for the second brewing water supply mode. The mentioned variables, which exceed or fall below the respective threshold value, respectively, may result, e.g., from a very fine degree of grinding of the ground material. By selecting the pulse mode, disadvantages associated therewith during the brewing water supply can be reduced or avoided.

It has to be pointed out in this context that the first brewing water supply mode, with which a certain amount of brewing water is initially supplied to the brewing water inlet of the brewing chamber, is a non-pulsed mode, in which the brewing water is supplied continuously (thus in a non-pulsed manner). The first brewing water supply mode is typically limited in time, in order to prepare a determination of the brewing water parameter. For example, the first brewing water supply mode serves for the first pressure build-up of the brewing water and/or for creating a first volume flow of brewing water through the brewing chamber. For example, the first brewing water supply mode is less than three seconds long or is less than five seconds long.

If—as is common practice—a brewing water pump is used to supply the brewing water, the non-pulsed mode, e.g., a continuous wave mode of the brewing water pump, is at its nominal power or a continuous mode of the brewing water pump is at a throttled power.

In the case of continuously supplying the brewing water in the first brewing water supply mode, it is conceivable but not necessary, for the brewing water to be supplied with the same parameters, as in the case of a continuous supply during the second brewing water supply mode. Such parameters comprise for example the pump power (thus the conveyed volume flow).

According to an aspect of the invention, the setting of the mode setting parameter can comprise the following:

selecting the continuous mode for the second brewing water supply mode, when the pressure at the brewing water inlet falls below a predetermined or predeterminable pressure threshold value and/or when the volume flow of the supplied brewing water at the brewing chamber inlet and/or the volume flow of the liquid, which escapes from the chamber outlet, exceeds or exceed, restively, a predetermined or predeterminable volume flow threshold value.

According to this aspect of the invention, the continuous mode for the second brewing water supply mode is thus selected, when the determination of the brewing water parameter shows that the pressure at the brewing water inlet is sufficiently low, thus does not exceed a threshold value for the pressure; according to this aspect of the invention, the continuous mode for the second brewing water supply mode is selected in the alternative or in addition, when the determination of the brewing water parameter shows that the volume flow of the supplied brewing water at the brewing chamber inlet and/or the volume flow of the liquid, which escapes from the chamber outlet, is sufficiently large, thus falls below a threshold value for the volume flow.

A pressure, which is below a threshold value, as well as volume flows, which are above a threshold volume, may suggest that the brewing process can be carried out better, when the continuous mode is selected for the second brewing water supply mode.

According to an aspect of the invention, the possibilities for setting the mode setting parameters are advantageously combined; in other words: according to this aspect of the invention, the setting of the mode setting parameters comprises the following:

selecting the pulse mode for the second brewing water supply mode, when the pressure at the brewing water inlet exceeds a predetermined or predeterminable pressure threshold value and/or when the volume flow of the supplied brewing water at the brewing chamber inlet and/or the volume flow of the liquid, which escapes from the chamber outlet, falls or fall below, respectively, a predetermined or predeterminable volume flow threshold value; and selecting the continuous mode for the second brewing water supply mode, when the pressure at the brewing water inlet falls below the predetermined or predeterminable pressure threshold value and/or when the volume flow of the supplied brewing water at the brewing water inlet and/or the volume flow of the liquid, which escapees from the chamber outlet, exceeds or exceed, respectively, the predetermined or predeterminable volume threshold value.

According to this aspect, it is provided that a switch-over between the pulse mode and the continuous mode (the non-pulsed mode) can be made during the second brewing water supply mode, namely as a function of the determined current property of the brewing water parameter, thus as a function of the pressure, which is included in the brewing water parameter and/or of the volume flow, which is included in the brewing water parameter.

In this context, for example, it may be provided after the transition from the first supply time period to the second supply time period that it is initially determined during the determination of the brewing water parameter that the pressure threshold value is exceeded and/or that the volume flow threshold value is fallen below. The brewing water during the second supply time period is then initially supplied in the pulse mode, for example in the pulse mode with unchanged additional pulse parameters or in the pulse mode with temporally variable additional pulse parameters.

During the second supply time period, the method steps are subsequently carried out again, after which the brewing water parameter is determined and is set for the second brewing water mode by using the Mode setting parameter as a function of the brewing water parameter.

When determining the brewing water parameter, it is now determined during the second supply time period that the pressure threshold value is fallen below and/or that the volume flow threshold value is exceeded, a switch-over is then made according to the described aspect of the invention into the continuous mode by correspondingly setting the mode setting parameter. This may contribute to shortening the time needed to prepare the coffee.

A change between the continuous mode and the pulse mode as needed is conceivable as well. It is possible in particular for a switch-back into the pulse mode to be made (again) when the continuous supply mode is carried out during the second supply time period and when a determination is made during determining the brewing water parameter that the pressure threshold value is exceeded (again) and/or that the volume flow threshold value is fallen below (again).

An automatic coffee machine for implementing the method according to the invention has, among other things: a brewing chamber for accommodating ground material, in particular ground coffee, wherein the brewing chamber has a brewing water inlet and a chamber outlet; a pump, preferably a reciprocating plunger type pump, for supplying brewing water to the brewing water inlet of the brewing chamber at a pressure; a pump control device for controlling the pump; and at least one measuring device, which is designed to capture measuring values for a pressure of the brewing water supplied to the brewing water inlet at the brewing water inlet and/or measuring values for a volume flow of the brewing water supplied to the brewing chamber inlet and/or measuring values for a volume flow of the liquid, which escapes from the chamber outlet, and to supply captured measuring values to the pump control device.

The pump control device is moreover configured to control the pump during a first supply time period and during a second supply time period, which follows the first supply time period, in such a way that brewing water can be supplied to the brewing water inlet by means of the pump during the first supply time period according to a first brewing water supply mode and during the second supply time period according to a second brewing water supply mode.

The pump is thereby configured to be controlled by the pump control device in such a way that the pump continuously supplies the brewing water to the brewing water inlet in the first brewing water supply mode during the first supplying time period, and supplies the brewing water during the second supply time period either in a continuous mode, in which the brewing water is continuously supplied to the brewing water inlet, or in a pulse mode, in which the brewing water is supplied in pulses at the brewing water inlet.

The pump control device is configured to control the pump during the second supply time period as a function of at least one captured measuring value of the measuring device in such a way that a supply of the brewing water as a function of the at least one captured measuring value either takes place in the continuous mode or in the pulse mode according to one of the following cases:

if the at least one captured measuring value is a measuring value for the pressure of the brewing water at the brewing water inlet supplied to the brewing water inlet, the brewing water is supplied in the pulse mode, when the measuring value for the pressure is larger than a predetermined or predeterminable pressure threshold value, and in the continuous mode, when the measuring value for the pressure is smaller than a predetermined or predeterminable pressure threshold value;

if the at least one captured measuring value is a measuring value for a volume flow of the brewing water supplied to the brewing chamber inlet or a measuring value for a volume flow of the liquid, which escapes from the chamber outlet, the brewing water is supplied in the pulse mode, when the measuring value for the volume flow is smaller than a predetermined or predeterminable volume flow threshold value, and in the continuous mode, when the measuring value for the volume flow is larger than a predetermined or predeterminable volume flow threshold value.

The pump control device is configured to implement the first brewing water supply mode and the second brewing water supply mode according to the method according to the invention. The pump control device is furthermore configured to deduce the brewing water parameter for setting the mode setting parameter for the second brewing water supply mode from the captured measuring values from the at least one measuring device.

The pump control device is configured to control the pump accordingly when implementing the first and/or second brewing water supply mode, thus to use the control to effect that the pump operates in the continuous operation (for a brewing water supply in the continue mode) or in the pulse operation (for a brewing water supply in the pulse mode) and/or switches between the mentioned operating types according to the method.

Provision is preferably made for the automatic coffee machine to include a grinder, which can be adjusted manually or automatically with regard to the degree of grinding, wherein provision is made for a degree of grinding sensor device, which is configured to supply the set degree of grinding to the pump control device.

BRIEF DESCRIPTION OF THE DRAWINGS

Further details of the invention and in particular an embodiment alternative of the method according to the invention will be discussed in more detail below by means of the enclosed drawings.

DETAILED DESCRIPTION OF THE PREFERRED EMBODIMENTS

Figure 1:
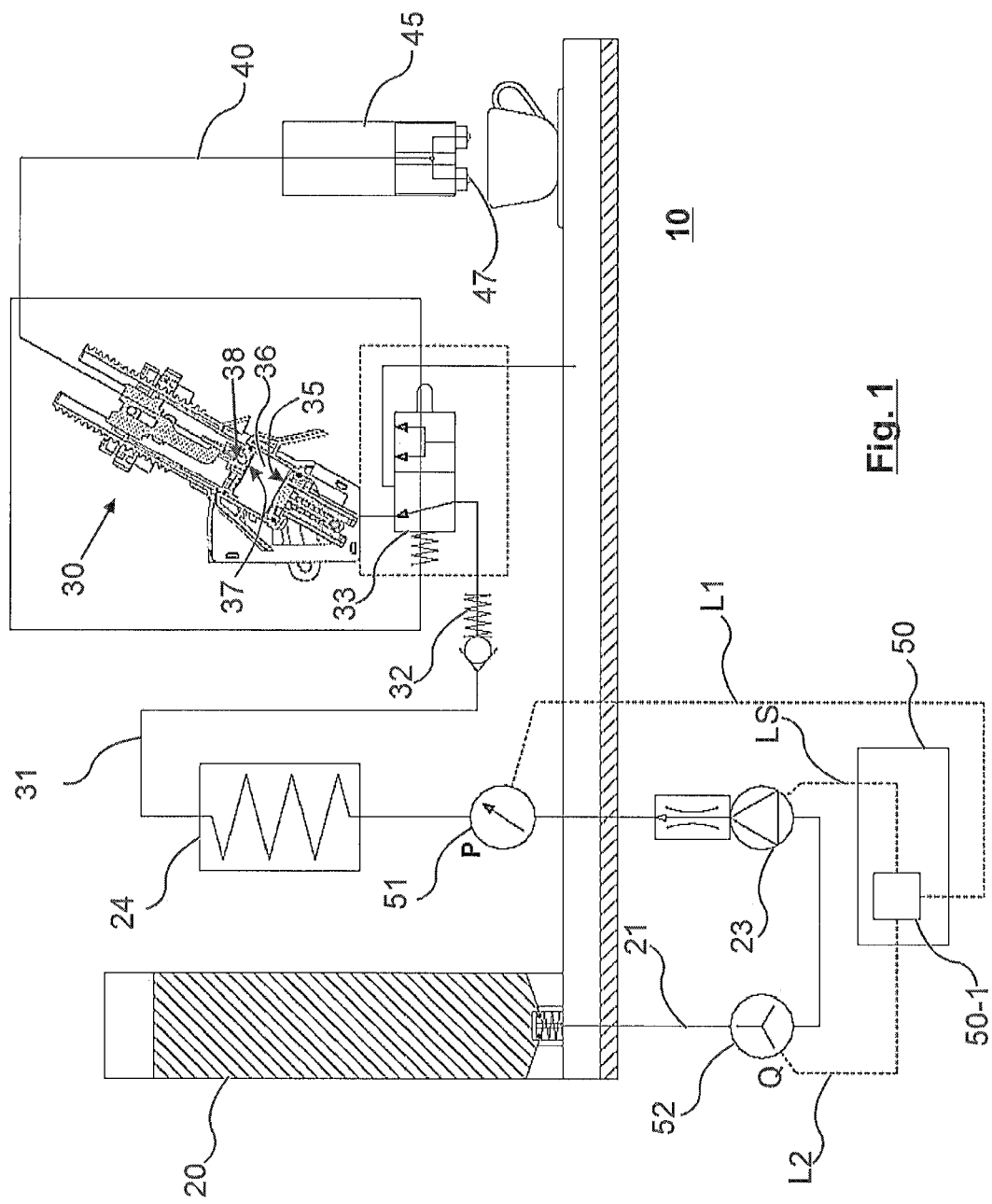
FIG. 1 shows a schematic illustration of an automatic coffee machine for implementing the method according to the invention described herein, comprising a brewing water pump, a brewing device comprising a brewing chamber, and a coffee dispensing device.

FIG. 1 shows a schematic illustration of an automatic coffee machine 10 for implementing the method according to the invention described herein. The automatic coffee machine 10 has a water tank 20, the outlet of which is connected to a fresh water line 21, which leads into the inlet of a brewing water pump 23. The brewing water pup 23 is embodied to initially supply the water conveyed by it via a further line from the water tank 20 to a brewing water heater 24, which heats the water to a desired brewing temperature. The brewing temperature is suitably chosen and can be controlled automatically. The outlet of the brewing water heater is connected to the brewing water inlet 35 of a brewing chamber 36 via a brewing water supply line 31, an adjoining non-return valve 32 and a control valve 33. The brewing chamber 36 is part of a brewing device 30 for preparing a coffee beverage and is filled with ground material (ground coffee) during a brewing process.

Brewing water, which is guided into the brewing chamber via the brewing water inlet 35, needs to pass through the ground material, before it escapes from a chamber outlet 37 of the brewing chamber 36. It is thereby enriched with coffee aromas in the desired way and is supplied via a coffee dispensing line 40 to a coffee dispensing device 45, from the coffee outlet opening 47 of which the coffee beverage is finally dispensed.

To implement the method according to the invention, provision is made for a control unit 50, which has a pump control device 50-1. The pump control device 50-1 is connected to the brewing water pump 23 via a control signal connection LS, and the pump control device 50-1 is configured to control the brewing water pump 23 via the control signal connection LS. To implement the method according to the invention, the controlling comprises at least one operation in the pulse mode, i.e. a turn-on and turn-off of the brewing water pump 23 at time intervals.

Provision is made for a pressure measuring device 51, which continuously captures the water pressure P, which is applied in the line system of the brewing water supply line 31 and thus at the brewing water inlet 35 of the brewing chamber 36. It continuously transmits this measuring value via a first measuring value connection L1 to the pump control device 50-1. It is important to note that the capturing of the pressure P and/or the transmission of the measuring value can also take place in suitable measuring intervals in a time-discrete manner.

In the case of the illustrated alternative, provision is furthermore made between the water tank 20 and the brewing water pump 23 for a flow meter 52, which continuously captures the flow quantity (the volume flow) Q of the brewing water, which passes through, and continuously transmits this measuring value via a second measuring value connection L2 to the pump control device 50-1. It is important to note that the capturing of the flow quantity Q and/or the transmission of the measuring value can also take place in suitable measuring intervals in at time-discrete manner.

In the case of other alternatives, provision may also be made for only one of the mentioned measuring devices 51, 52. In the case of further alternatives, provision may be made for the flow meter 52 to be provided at a different location, for example at the chamber outlet of the brewing chamber or in the outlet branch, respectively, of the coffee beverage, which is to be generated.

In the example at hand, the brewing device 30 is equipped to brew ground material in the brewing chamber 36 with pressurized brewing water, in order to make it possible, for example, to generate a coffee beverage in the form of espresso. For this purpose, the brewing device 30 is equipped with a créma valve 38, which controls the escape of a liquid, which is located in the brewing chamber 36, from the chamber outlet 37 of the brewing chamber 36, so that a liquid can only flow from the brewing chamber 36 via the chamber outlet 37 and the créma valve 38 into the coffee dispensing line 40 and can reach the coffee outlet opening 47, when the pressure of the liquid at the chamber outlet 37 reaches or exceeds, respectively a predetermined threshold value. This threshold value can for example be in the range of 3-9 bar in order to make it possible to generate a coffee beverage in the form of espresso. To achieve that the ground material can be brewed in the brewing chamber with brewing water at a pressure in the range of 3-9 bar, the brewing water pump 23 in the example at hand is designed to supply brewing water to the brewing water supply line 31 at a pressure of for example 15 bar.

Figure 18:
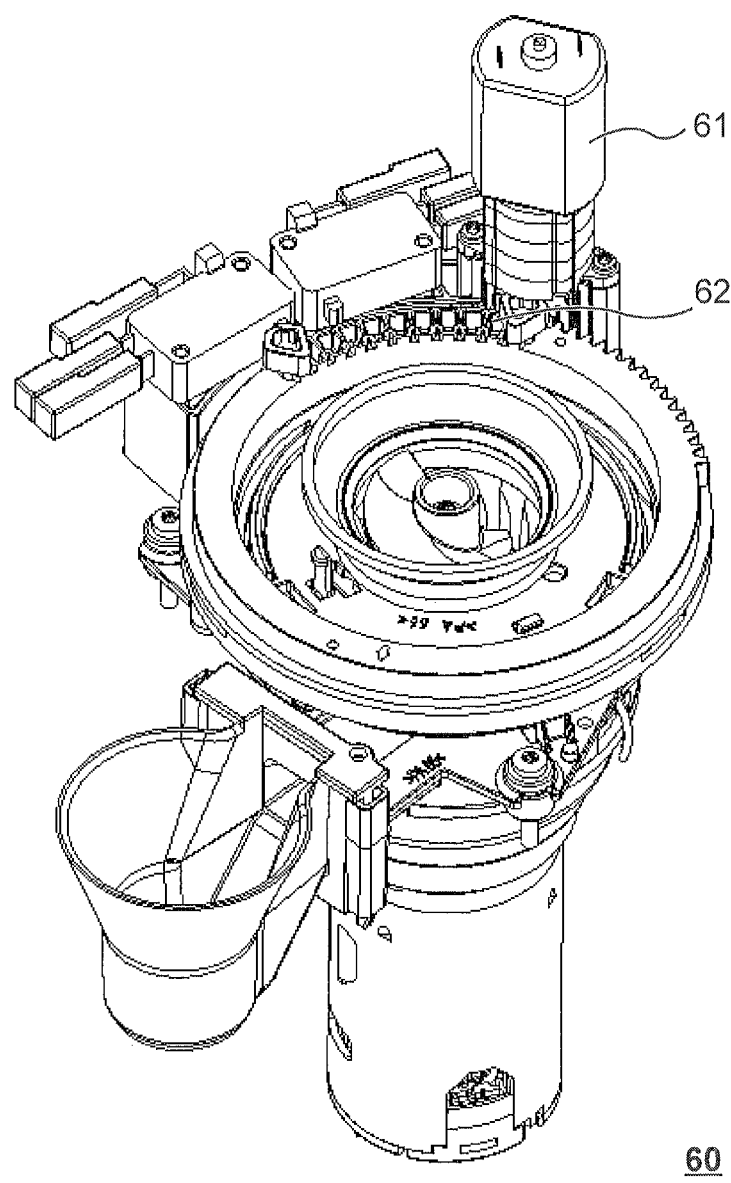
FIG. 18 shows a perspective schematic view of an automatically adjustable grinder, for use in an automatic coffee machine in connection with the invention at hand.

According to the alternative according to FIG. 1, the automatic coffee machine 10 is also equipped with an automatically adjustable grinder 60, as it is illustrated in a perspective view in FIG. 18. The automatically adjustable grinder 60 has an actuator 61, which is embodied to automatically set the degree of grinding via a control gear 62. It is possible hereby to automatically adapt the degree of grinding between different grinding processes to the actual circumstances, for example to the degree of roasting of the coffee beans or to the moisture content thereof. It is also possible, however, to change the degree of grinding according to a selected (predeterminable) setting. The selected setting can refer to the indication of the degree of grinding itself; however, a setting, which has an indirect impact on the degree of grinding, which is to be set, can also be selected, such as, e.g. the type of a coffee beverage, which is to be dispensed.

Figure 19:
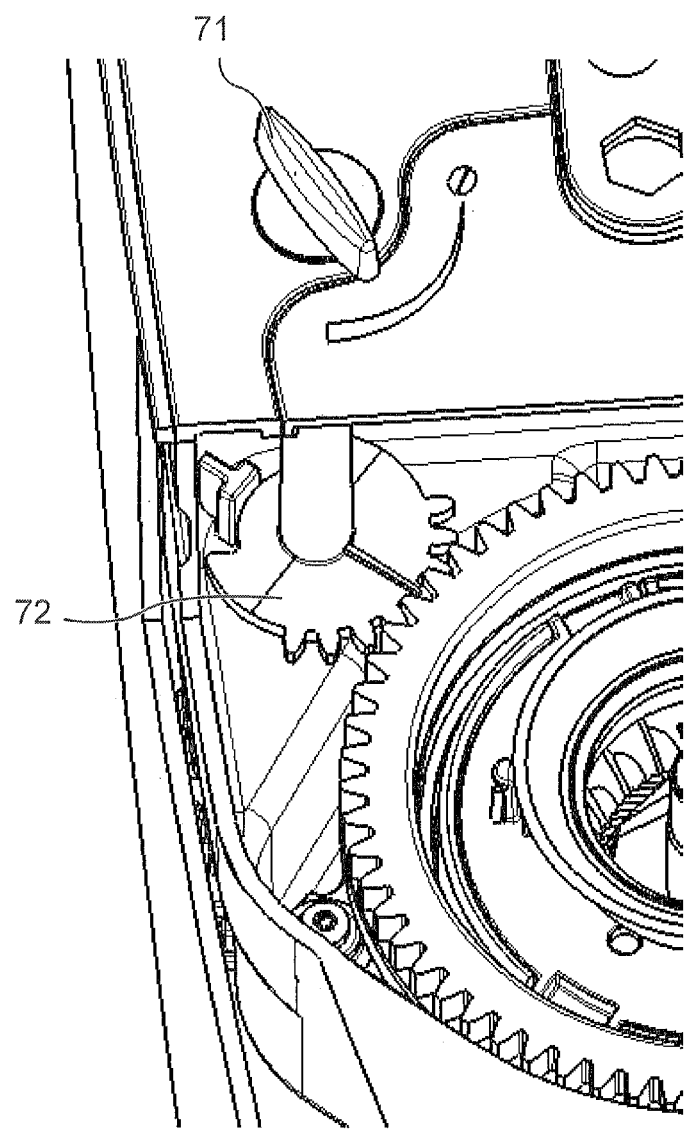
FIG. 19 shows a perspective schematic view of a section of a manually adjustable grinder, for use in an automatic coffee machine in connection with the invention at hand.

In the case of other alternatives, the automatic coffee machine 10 can alternatively be equipped with a manually adjustable grinder 70, which is shown in FIG. 19. Said grinder has an adjusting device 71, which can be adjusted by an operator and which is mechanically connected to a control gear 72, in order to set the degree of grinding.

An adjustable grinder 60, 70, however, is not necessary in order to be able to implement the method according to the invention in an expedient manner; it may thus also be provided to use the method according to the invention in automatic coffee machines, which are manually filled with coffee powder and which may have different degrees of grinding. When the grinder is not embodied so as to be adjustable, the degree of grinding may also fluctuate, e.g. when the coffee beans, which are to be ground, have different degrees of moisture or the like.

The embodiment of the method according to the invention is set in motion at the beginning of a brewing process, typically after the brewing chamber 36 has been filled with fresh ground coffee (ground material). These and further measures, which are not directly connected to the method according to the invention, such as, e.g. an automatic grinding process, the filling of the brewing chamber 36 with ground coffee, a measuring of the total coffee volume during the brewing process for appropriately ending the process, the ejection of the used dregs and the like, can for example be made by the control unit 50.

To carry out the method according to the invention, the pump control unit 50-1 now initially controls the brewing water pump 23 during a first supply time period in such a way that brewing water is continuously supplied to the brewing water inlet 35 according to a first brewing water supply mode. Typically, the first supply time period is relatively short, e.g. shorter than three seconds or shorter than five seconds, and it serves the purpose of allow the determination of a brewing water parameter during a following second supply time period. On principle, this determination is made with the help of the pressure measuring device 51 and/or with the help of the flow meter device 52.

In the second supply time period, the brewing water parameter is determined continuously in a loop processing, a mode setting parameter for a second brewing water supply mode is set, and brewing water is supplied to the brewing water inlet 35 according to the second brewing water supply mode. In the case of the illustrated alternative, the mode setting parameter is set by the pump control device 50-1, namely on the basis of the brewing water parameter, which it deduces from the measuring values from the pressure measuring device 51 and/or from the flow meter device 52. The mode setting parameter defines at least one continuous mode for the second brewing water supply mode as well as a pulse mode for the second brewing water supply mode; the continuous mode and/or the pulse mode is or are, respectively, implemented by means of a corresponding control (a continuous control or a pulsed control, respectively), of the brewing water pump 23 by means of the pump control device 50-1.

The pump control device 50-1 is thus configured to control the pump 23 with a pulse signal, which includes a plurality of consecutive pulses, wherein the pump 23 is turned on by controlling with one of the pulses, and is in each case turned off in a pulse pause between two consecutive pulses, in order to make it possible to supply the brewing water in the pulse mode.

In the case of the alternatives of the method according to the invention described below, only the process during the second supply time period is described.

Figure 2:
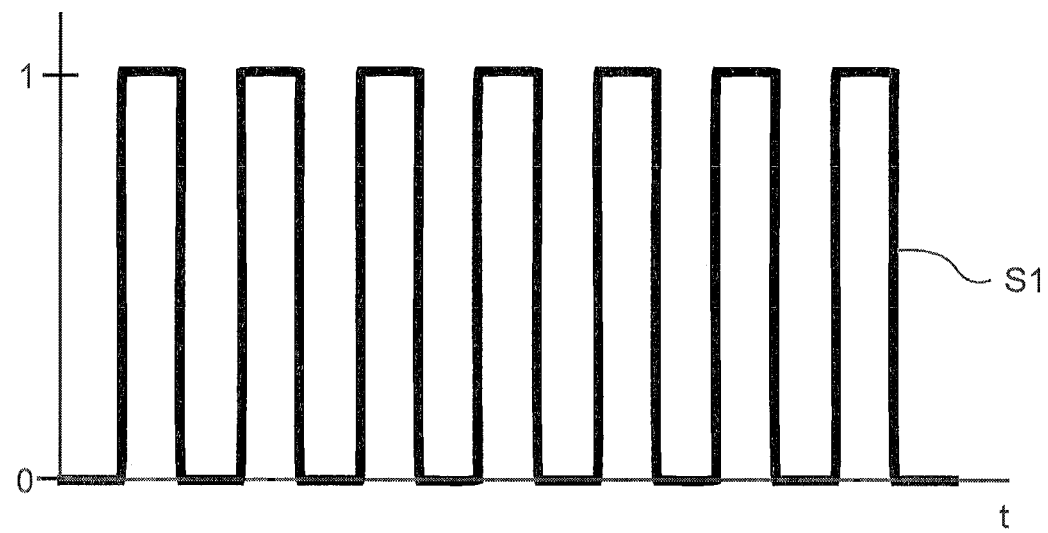
FIG. 2 shows a pulse signal for controlling the brewing water pump with a pulse signal according to an embodiment of the method.

FIG. 2 shows the chronological sequence of a (pulse) signal S1, i.e. the signal S1 as a function of the time t. The signal S1 is generated by the pump control device 50-1 and is supplied to the brewing water pump via the control signal connection LS. While the signal S1 is at the high signal level (said signal level is identified with "1" on the vertical axis in a dimensionless manner), the brewing water pump 23 is turned on. When the signal S1 is at the low signal level (this is identified with "0" on the vertical axis in a dimensionless manner), the brewing water pump 23 is thus turned off. In the example shown in FIG. 2, the time period of an individual on-period (the pulse on-time) is approximately identical to the time period of an individual off-period (the pulse pause time). In the example according to FIG. 2, the pulse duration of an individual pulse (the pulse on-time thereof) is approximately 0.1 seconds.

For the signal course S1 shown in FIG. 2, a brewing water parameter was determined during the implementation of the method according to the invention, which suggests that an advantageous course of the brewing process could take place by means of a corresponding control of the brewing water pump 23 in pulses. It was determined for example that the measuring value for the pressure P determined by the pressure measuring device 51 was above a threshold value, or it was determined in the alternative or in addition that the volume flow measuring value from the flow meter 52 was below a threshold value. Both may suggest that the degree of grinding of the ground material inside the brewing chamber 36 is so fine that a passage of the brewing water is made more difficult. The pulse course makes it possible to make such a passage easier.

Figure 3:
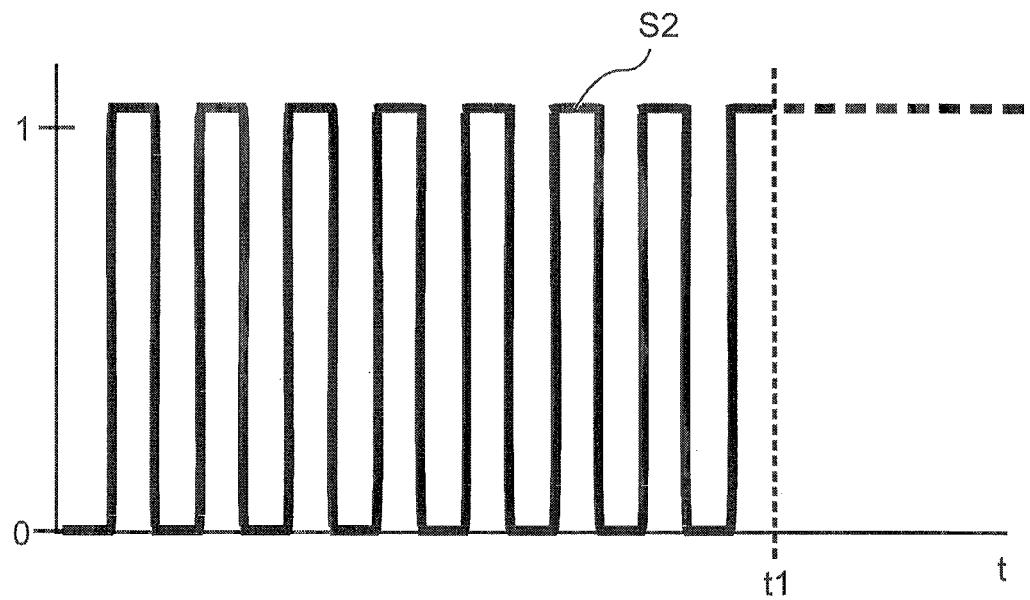
FIG. 3 shows a pulse signal for controlling the brewing water pump with a pulse signal and a following continuous signal according to a further embodiment of the method.

FIG. 3 shows the course of a signal S2, as it may serve to control the brewing water pump 23, according to a further alternative. What has been described in connection with the signal S1 applies substantially for the signal S2. In contrast, however, provision is made in the case of the signal S2 according to FIG. 3 that, at a point in time t1, after a time period in the pulse mode, a brewing water parameter is determined, which suggests that the brewing process could proceed advantageously due to a continuous operation of the brewing water pump 23. It was determined, for example, that the measuring value for the pressure P determined by the pressure measuring device 51 has fallen below a threshold value again, or it was determined in the alternative or additionally that the volume flow measuring value from the flow meter 52 has risen above a threshold value. Both may suggest that, due to the previous pulse mode, brewing water can now pass through the ground material in the brewing chamber again by means of continuous brewing water supply. The continuous operation of the brewing water pump 23 starting at the point in time t1 is suggested by a dashed line of the signal S8, starting at this point in time.

Figure 4:
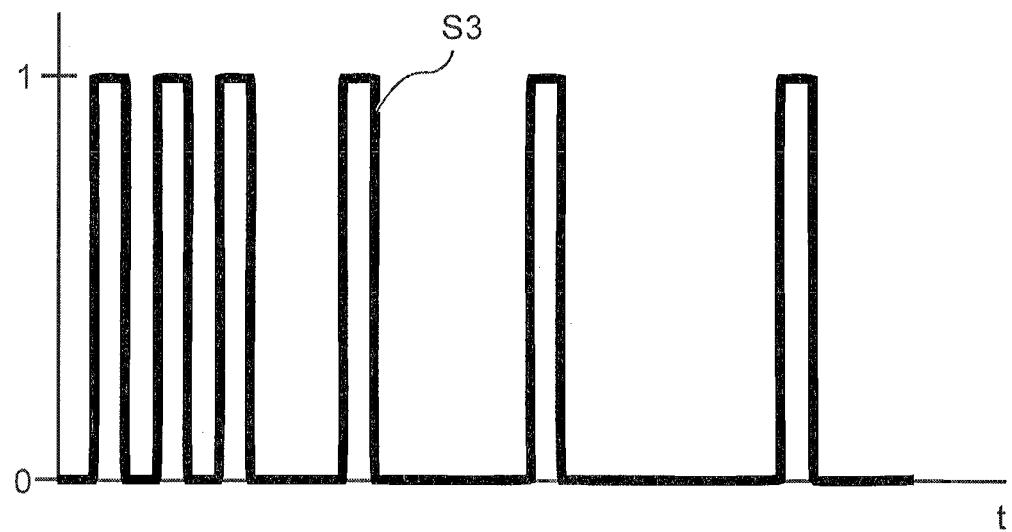
FIG. 4 shows a pulse signal for controlling the brewing water pump with a pulse signal comprising a progressive course of the pulse pause duration according to a further embodiment of the method.
Figure 5:
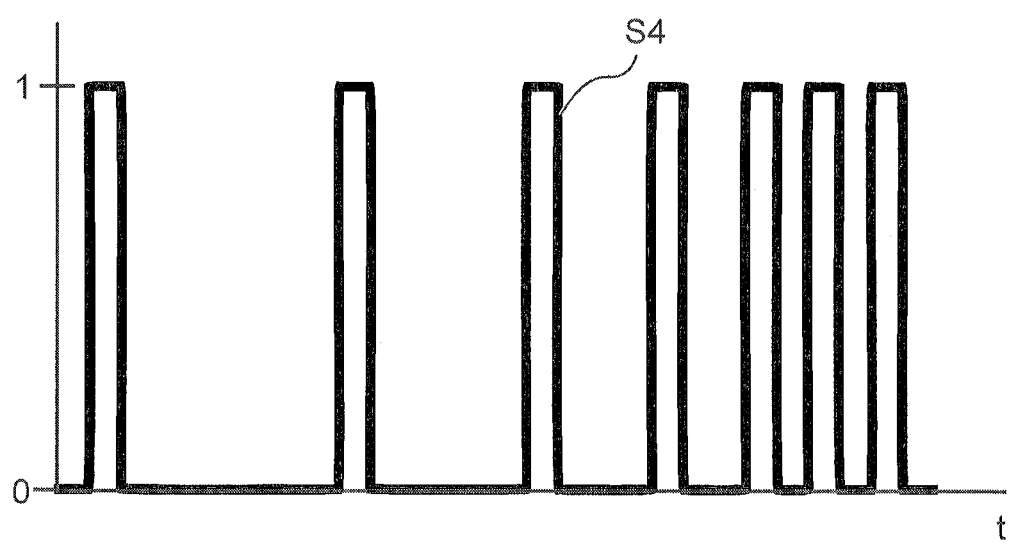
FIG. 5 shows a pulse signal for controlling the brewing water pump with a pulse signal comprising a degressive course of the pulse pause duration according to a further embodiment of the method.
Figure 6:
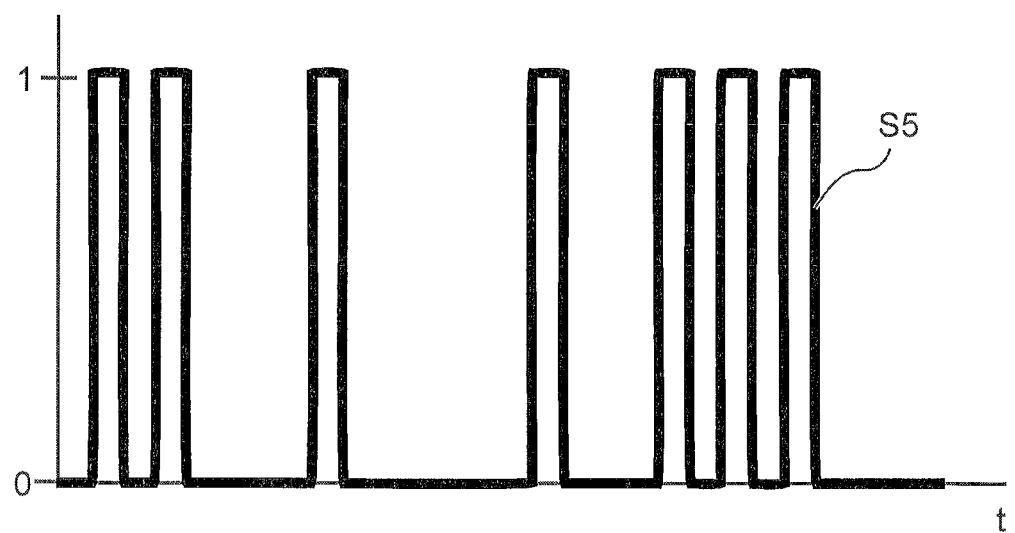
FIG. 6 shows a pulse signal for controlling the brewing water pump with a pulse signal comprising a progressive-degressive course of the pulse pause duration according to a further embodiment of the method.
Figure 7:
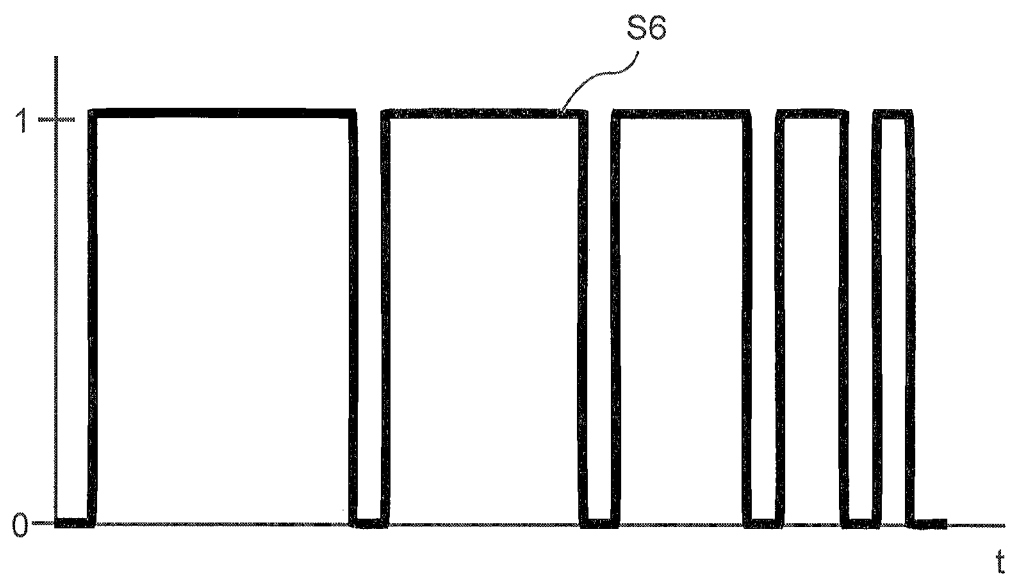
FIG. 7 shows a pulse signal for controlling the brewing water pump with a pulse signal comprising a degressive course of the pulse on-time according to a further embodiment of the method.
Figure 8:
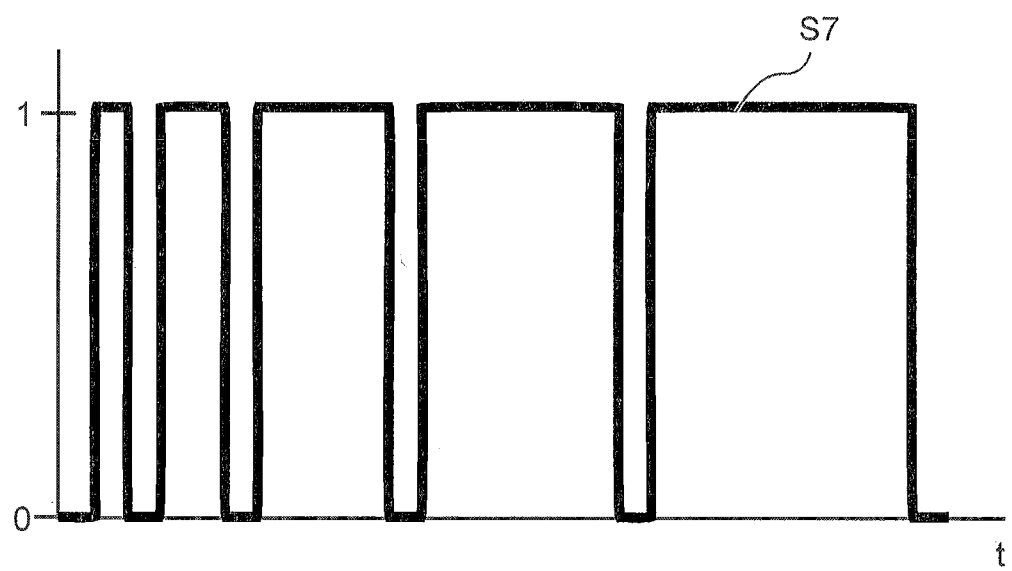
FIG. 8 shows a pulse signal for controlling the brewing water pump with a pulse signal comprising a progressive course of the pulse on-time according to a further embodiment of the method.
Figure 9:
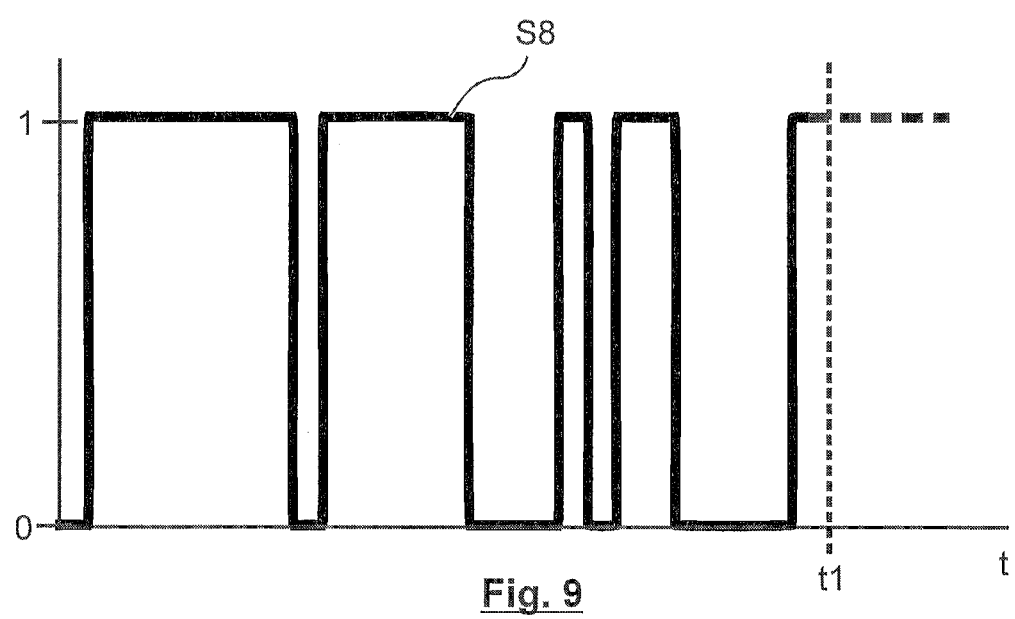
FIG. 9 shows a pulse signal for controlling the brewing water pump with a pulse signal comprising a variable course of the pulse on-time and the pulse pause duration as well as with a following continuous signal according to a further embodiment of the method.

Analogous to FIGS. 2 and 3, FIG. 4 shows a signal course S3. The pulse on-time is unchanged across the signal course S3; however, the pulse pause duration is extended after a few pulses (in the shown example: after three pulses). This corresponds to a progressive course of time of the pulse pause duration. Such a signal course may contribute to an advantageous passage of brewing water through the brewing chamber 36 during the second supply time period.

Analogous to FIGS. 2 to 4, FIG. 5 shows a signal course S4. The pulse on-time is unchanged again across the signal course S4; however, the pulse pause duration is shortened over time. This corresponds to a degressive course of time of the pulse pause duration. Such a signal course may contribute to an advantageous passage of brewing water through the brewing chamber 36 during the second supply time period.

Analogous to FIGS. 2 to 5, FIG. 6 shows a signal course S5. The pulse on-time is unchanged again across the signal course S5; however, the pulse pause duration follows a progressive-degressive course of time. Such a signal curse may lead to an advantageous passage of brewing water through the brewing chamber 36 during the second supply time period.

Analogous to FIGS. 2 to 6, FIG. 7 shows a signal course S6. The pulse pause duration is unchanged across the signal course S6. However, the pulse on-time is shortened across the signal course S6, which corresponds to a degressive course of time of the pulse on-time. Such a signal course may lead to an advantageous passage of brewing water through the brewing chamber 36 during the second supply time period.

Analogous to FIGS. 2 to 7, FIG. 8 shows a signal course S7. The pulse pause duration is unchanged across the signal course S7. However, the pulse on-time is extended across the signal course S6, which corresponds to a progressive course of time of the pulse on-time. Such a signal course may lead to an advantageous passage of brewing water through the brewing chamber 36 during the second supply time period.

Analogous to FIGS. 2 to 8, FIG. 9 shows a signal course S8. In the case of the signal course S8, the pulse on-time as well as the pulse pause duration is changed over time (repeatedly variable pulse mode). Analogous to the signal course S2, which is shown in FIG. 3, it also applies that, at a point in time t1 after a time period in the above-described repeatedly variable pulse mode, a brewing water parameter is determined, which suggests that an advantageous course of the brewing process could take place by means of a continuous operation of the brewing water pump 23. Starting at the point in time t1, a continuous operation of the brewing water pump 23 thus takes place in the case of the signal course S8, which is suggested by the dashed line in FIG. 9. Such a signal course may lead to an advantageous passage of brewing water through the brewing chamber 36 during the second supply time period.

For the sake of clarity and for a better comparability, the schematic diagrams in FIGS. 10 to 17 are shown as diagrams with dual vertical axes, and the pressure P or the chronological sequence of the pressure P, respectively, as well as the flow (volume flow) Q or the chronological sequence of the flow Q, respectively, are in each case illustrated in the diagrams. The curves, which show the pressure or the pressure course, respectively, are illustrated with solid lines and are identified with P or P1 to P7, respectively. The curves, which show the flow or the flow course, respectively, are accordingly illustrated with dashed lines and are identified with Q or Q1 to Q7, respectively. Even though no scales are specified for the axes of the pressure (P) or for the axes of the flow (Q), the relative illustrations of the pressure courses or of the flow courses, respectively, between the individual diagrams are comparable.

Figure 10:
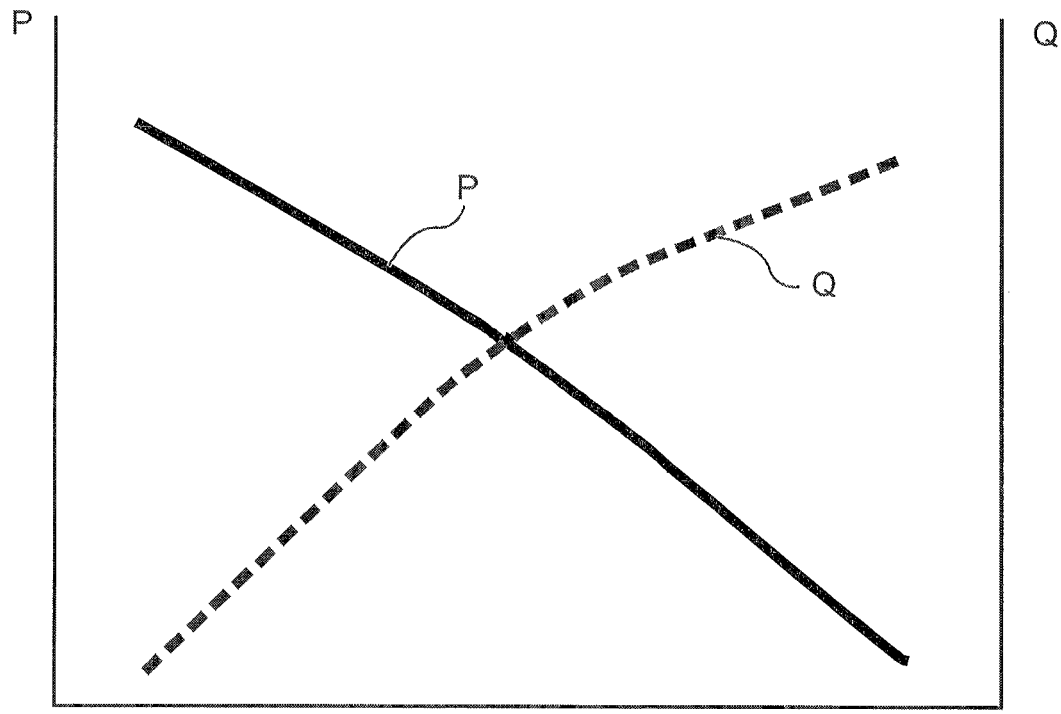
FIG. 10 shows a schematic illustration of pressure and flow as a function of the degree of grinding, in the case of an automatic coffee machine for implementing the method.

FIG. 10 shows a schematic illustration of pressure P and flow Q as a function of the degree of grinding, when the pump capacity is constant during the entire brewing process. The method according to the invention is thus not used in the case of a curve course according to FIG. 10. The curves run from left to right from a fine degree of grinding to a coarse degree of grinding. As can be seen, the pressure P is high in the case of a fine degree of grinding and a constant pump capacity, so as to decrease towards a coarser degree of grinding. The curve for the flow is in the opposite direction: in the case of a fine degree of grinding, the flow is small, so as to increase towards a coarser degree of grinding.

Figure 11:
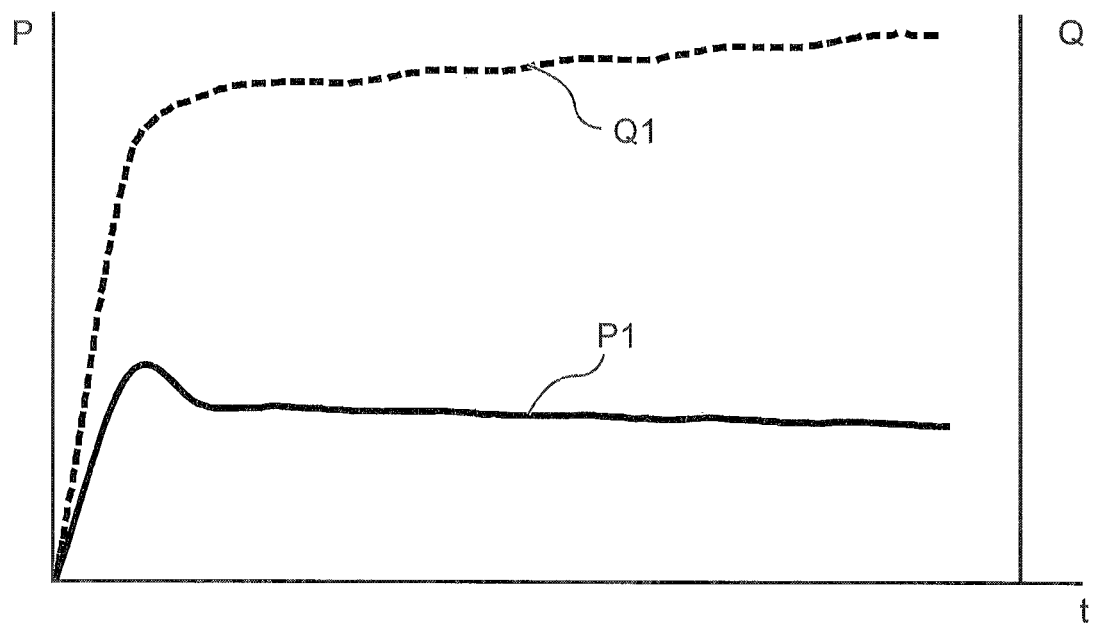
FIG. 11 shows a schematic illustration of pressure and flow over time in the case of a coarse degree of grinding and constant pump capacity.

FIG. 11 now shows a schematic illustration of pressure P and flow Q over time in the case of a coarse degree of grinding and in the case of a pump capacity, which is constant during the entire brewing process, thus without using the method according to the invention. In the example at hand, the chronological sequence of the pressure is identified with P1 and the chronological sequence of the flow is identified with Q1. In the chronological sequence, the pressure P1 increases, until a certain value has been exceeded, then decreases slightly, and is substantially constant over the further time of the brewing process. The flow quantity Q1 also first increases only so as to be substantially constant as well. For the shown coarser degree of grinding of the ground material, these curves show a desirable course.

Figure 12:
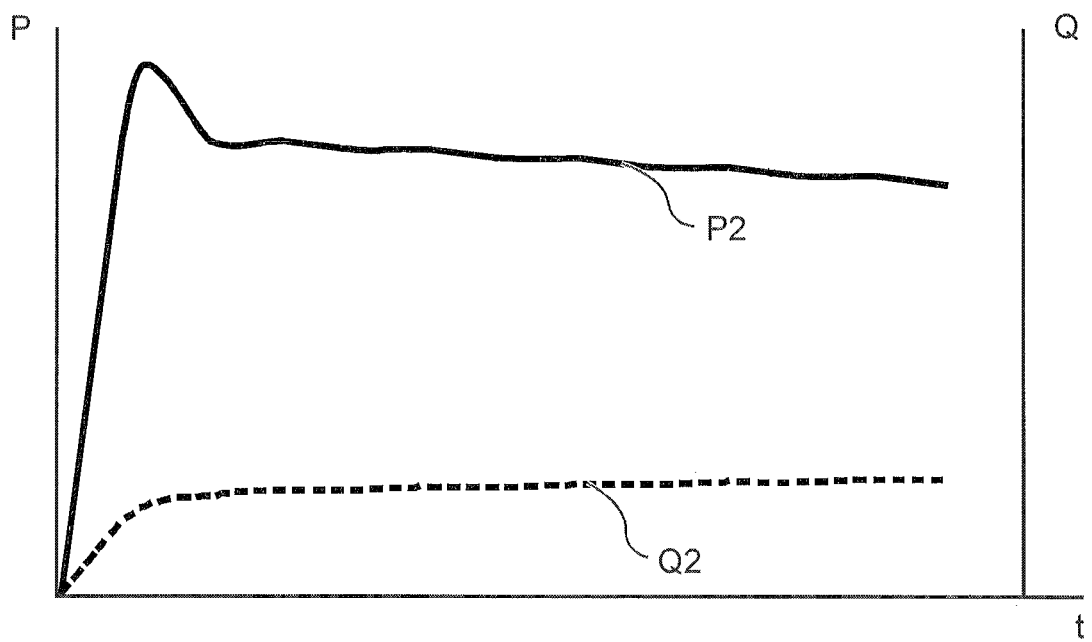
FIG. 12 shows a schematic illustration of pressure and flow over time in the case of a fine degree of grinding and constant pump capacity.

Analogous to FIG. 11, FIG. 12 shows a schematic illustration of pressure P and flow Q over time in the case of a fine degree of grinding and with a pump capacity, which is constant during the entire brewing process, thus, in turn, without the method according to the invention being used. In the example at hand, the chronological sequence of the pressure is identified with P2 and the chronological sequence of the flow with Q2. In the case of a fine degree of grinding, the used ground coffee can be compressed significantly more strongly in the brewing chamber 36, so that the passage of brewing water is made more difficult: the pressure P2 increases much more in the chronological sequence than in the case of FIG. 11; the flow quantity Q2 remains correspondingly small.

Figure 13:
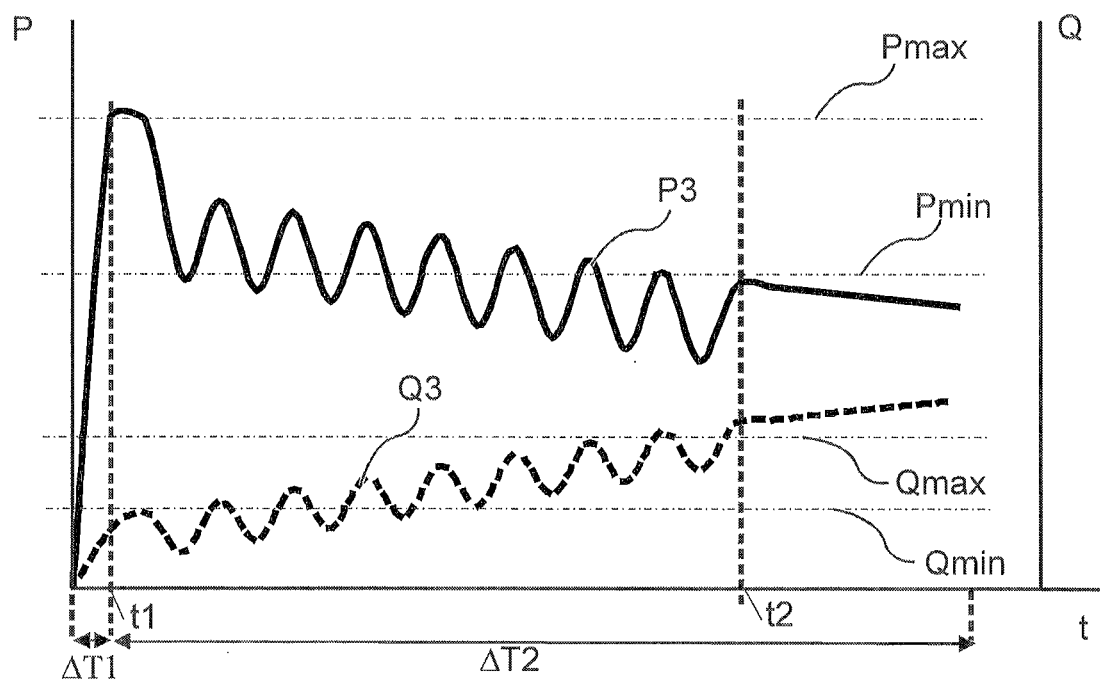
FIG. 13 shows a schematic illustration of pressure and flow over time in the case of a very fine degree of grinding and a temporary operation of the pump in the pulse mode.

FIG. 13 now shows a schematic illustration of pressure P and flow Q over time in the case of a very fine degree of grinding and a temporary operation of the pump in the pulse mode according to the method according to the invention. The degree of grinding is even finer here than in the case of the curve shown in FIG. 12. It turned out that, in the case of such a fine degree of grinding, as it is used for a brewing process according to the signals shown in FIG. 13, the pressure of the supplied brewing water would have to be excessively high, before brewing water would be able to pass through the brewing chamber 36 at all. If, in the case of such a fine degree of grinding of the ground material, the pump 23 is controlled in such a way that it continuously supplies the brewing water under the pressure, which is typically available, to the brewing chamber inlet 45, the volume flow of the brewing water, which may possibly be able to flow through the ground material in the brewing chamber, would be unacceptably small, whereby there is even the risk that the brewing chamber 36 clogs.

In FIG. 13, Qmin and Qmax now specify a lower threshold value or an upper threshold value, respectively, for the flow Q; Pmin and Pmax accordingly specify a lower threshold value or an upper threshold value, respectively, for the pressure P. In the example at hand, the chronological sequence of the pressure is identified with P3 and the chronological sequence of the flow is identified with Q3.

At the beginning of the brewing process, until the point in time, which is identified with t1 in FIG. 13, the brewing water pump 23 is operated continuously. This corresponds to the first supply time period, the duration of which is illustrated in FIG. 13 with a double arrow, which is identified with reference numeral $\Delta T1$, wherein the two ends of the double arrow, suggest the beginning and the end of the first supply time period $\Delta T1$. The pressure measuring device 51 subsequently transmits a measuring value, which is above the upper threshold value Pmax for the pressure, to the pump control device 50-1. The flow meter 52 simultaneously transmits a measuring value, which is below the lower threshold value Qmin for the flow, to the pump control device 50-1.

The pump control device 50-1, which, starting at the point in time t1, is in the second supply time period, deduces a brewing water parameter from this, which suggests that an operation in the pulse mode is advantageous. FIG. 13 illustrates the duration of the second supply time period with a double arrow, which is identified with reference numeral $\Delta T2$, wherein the two ends of the double arrow suggest the beginning and the end of the second supply time period $\Delta T2$. The pump control device 50-1 thus sets the mode setting parameter in such a way that the brewing water is supplied in a pulse mode, which corresponds to the second brewing water supply mode of the method here.

The supply in pulses can be seen in FIG. 13 by the fluctuations of the pressure course P3 and of the course Q3 for the flow. It is assumed that certain thrusts, which loosen the ground material little by little and which facilitate the passage of brewing water, are exerted on the ground material by the operation in the pulse mode. In the meantime, the brewing water supply is continued in the pulse mode and the brewing water parameter is evaluated again continuously by means of the measuring data from the measuring devices 51 and 52.

As can be seen, the supply of the brewing water in pulses in the time period t1<t<t2 has the effect that the volume flow Q3 of the brewing water supplied to the brewing chamber increases continuously relatively strongly over time in this time period (averaged over time). The pressure P3 at the brewing water inlet 35 thus decreases continuously over time in the time period t1<t<t2 (averaged over time). The supply of the brewing water in pulses thus reduces the risk of a clogging of the brewing chamber 36 (which, as mentioned, is present in the case at hand, when the pump 23 is controlled in such a way that it continuously supplies the brewing water).

A sufficient loosening state is identified during the second supply time period $\Delta T2$ at the point in time t2 in that the measuring signal Q3 exceeds an upper threshold value Qmax for the flow, and the measuring signal P3 falls below a lower threshold value Pmin for the pressure.

The pump control device 50-1 thus sets the mode setting parameter in such a way that, starting at the point in time t2, the brewing water is supplied in the continuous mode. The further coffee delivery can thus be accelerated.

Figure 14:
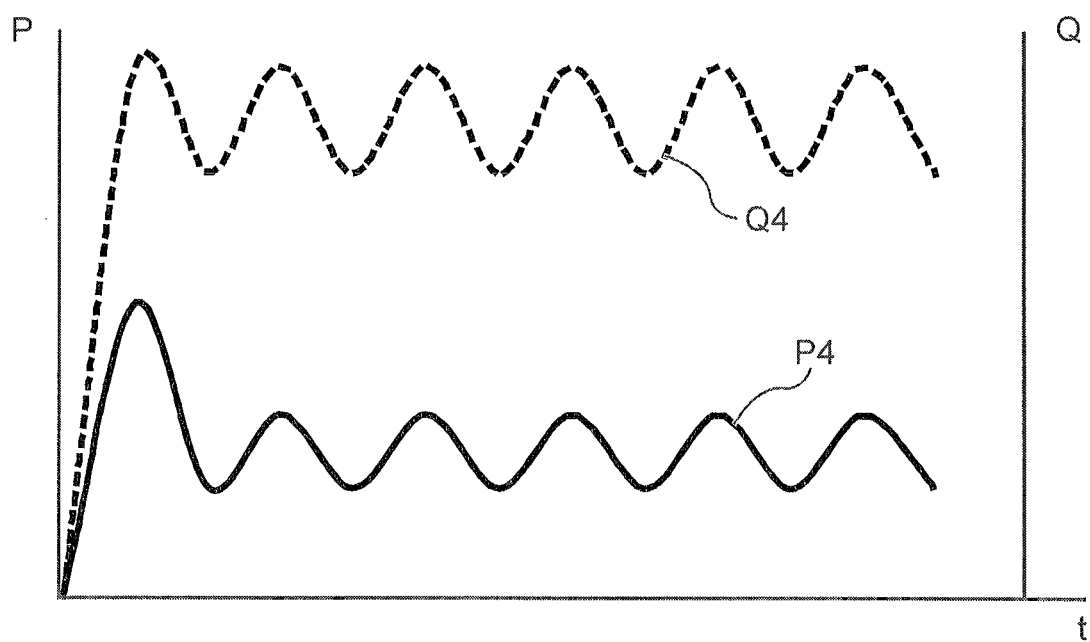
FIG. 14 shows a schematic illustration of pressure and flow over time in the case of a coarse degree of grinding and operation of the pump in the pulse mode with short pulse duration.
Figure 15:
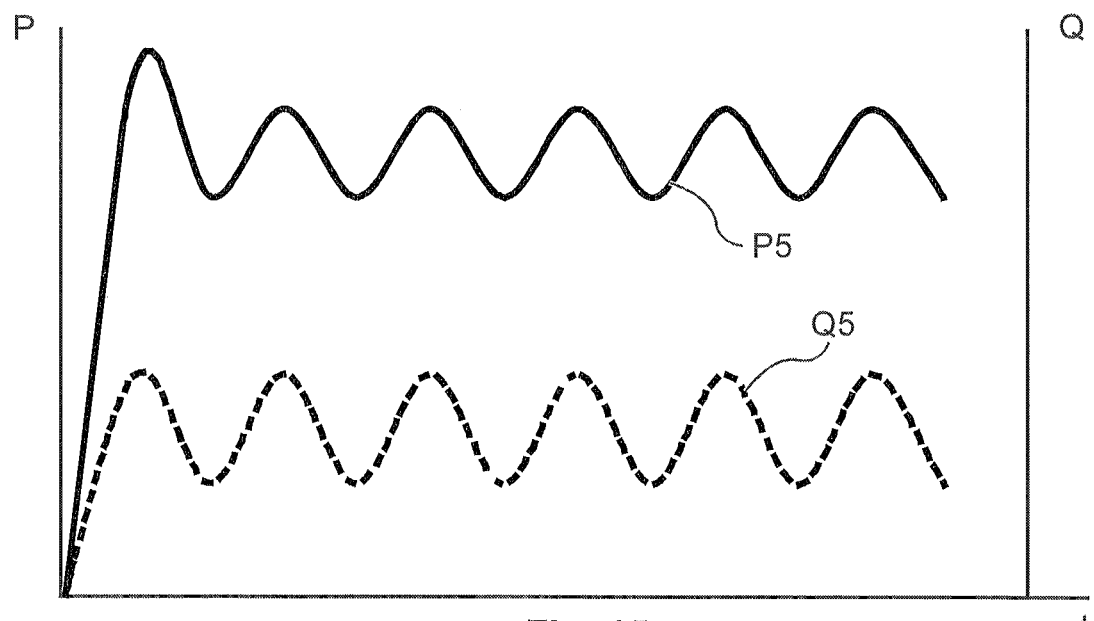
FIG. 15 shows a schematic illustration of pressure and flow over time in the case of a fine degree of grinding and operation of the pump in the pulse mode with short pulse duration.

FIG. 14 shows a schematic illustration of pressure P and flow Q over time in the case of a coarse degree of grinding and operation of the pump in the pulse mode with a short pulse duration. In the example at hand, the chronological sequence of the pressure is identified with P4 and the chronological sequence of the flow with Q5. In the illustrated example of FIGS. 14 and 15, uniform pulses are used, in the case of which the pulse on-time and the pulse pause duration are equally long. In the case of a short pulse duration, the on-time and the pause duration of the pulses are in each case approximately 0.1 to 0.2 seconds. Analogous to FIG. 14, FIG. 15 shows a schematic illustration of pressure P5 and flow Q5 over time in the case of a fine degree of grinding and operation of the pump in the pulse mode with a short pulse duration. It turns out that, in spite of a fine degree of grinding, a flow Q5 is at hand, when the brewing water supply takes place in the second supply time period with short pulses.

Figure 16:
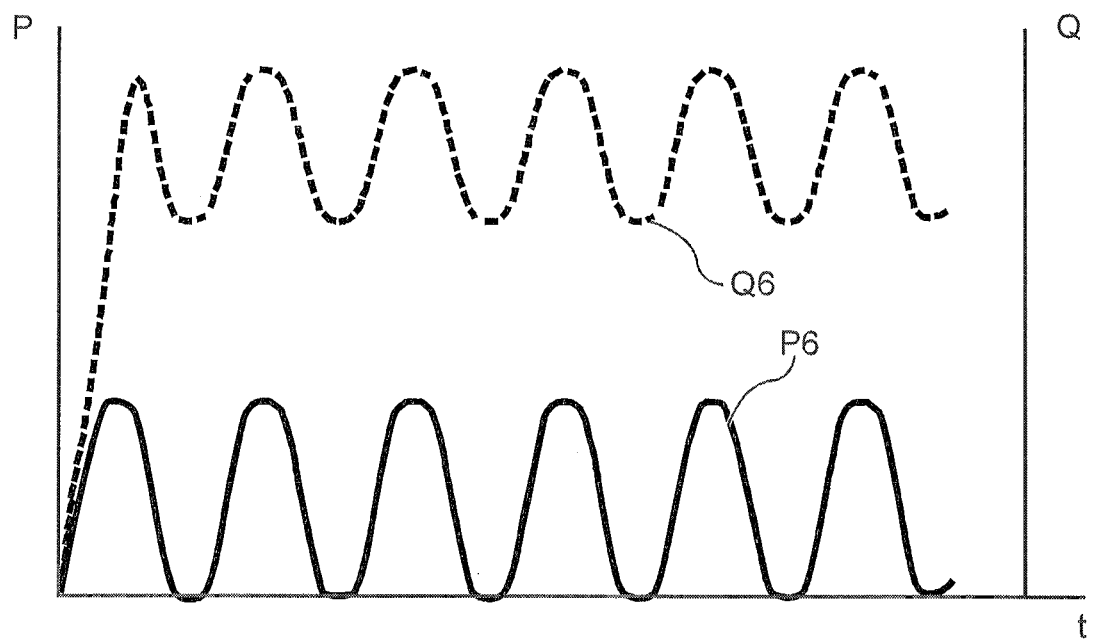
FIG. 16 shows a schematic illustration of pressure and flow over time in the case of a coarse degree of grinding and operation of the pump in the pulse mode with long pulse duration.
Figure 17:
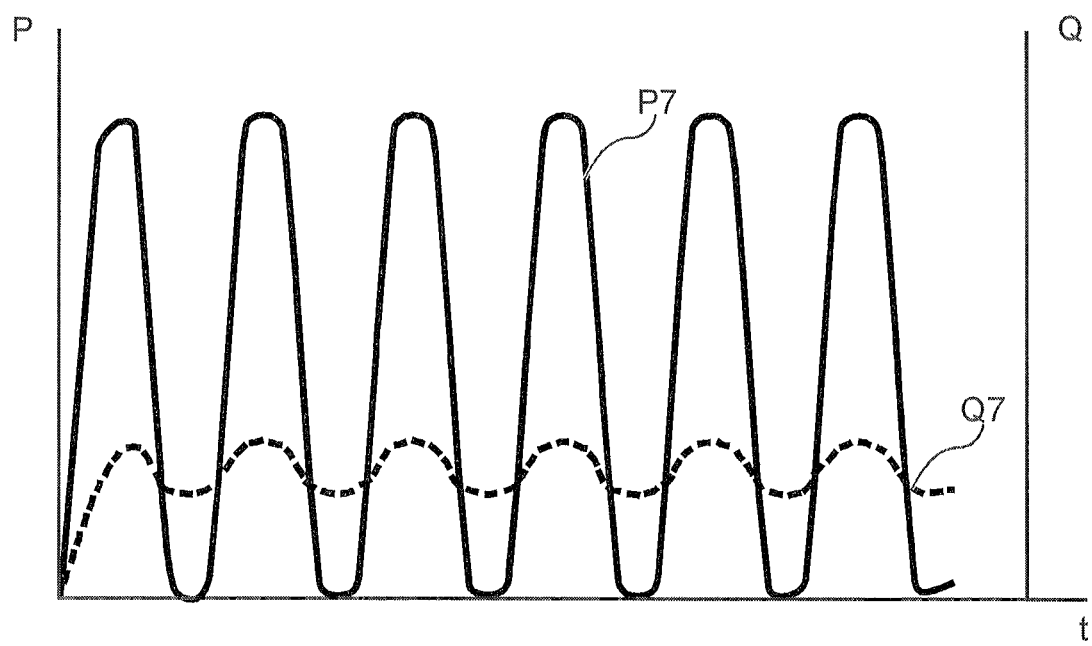
FIG. 17 shows a schematic illustration of pressure and flow over time in the case of a fine degree of grinding and operation of the pump in the pulse mode with long pulse duration.

Analogous to FIGS. 14 and 15, FIG. 16 shows a schematic illustration of pressure P and flow Q over time in the case of a coarse degree of grinding and operation of the pump in the pulse mode with a long pulse duration. In the example at hand, the chronological sequence of the pressure is identified with P6 and the chronological sequence of the flow with Q6. In the illustrated case of FIGS. 16 and 17, uniform pulses are used, in the case of which the pulse on-time and the pulse pause duration are equally long. In the case of a long pulse duration, the on-time and the pause duration of the pulses are in each case approximately 2 seconds. It turns out here that even though the pressure P6 decreases more strongly in the pulse pauses than in the case of the short pulses according to FIG. 14, a sufficient flow Q6 is also at hand in the case of long pulses. Analogous to FIG. 16, FIG. 17 finally shows a schematic illustration of pressure P and flow Q over time in the case of a fine degree of grinding and operation of the pump in the pulse mode with long pulse duration. In the case at hand, the chronological sequence of the pressure is identified with P7 and the chronological sequence of the flow with Q7. The pressure fluctuations, in turn, are strong; nonetheless, a reliable flow Q7 over time follows here as well.

With regard to the supply of the brewing water in the pulse mode, it is thus advantageous, when the pump control device 50-1 controls the pump 23 in the second supply time period ΔT2 with a pulse signal, at which the respective pulse pauses between two consecutive pulses have a duration in the range of between 0.05 and seconds. Under these circumstances, the supply of brewing water in pulses in the case of ground material with a particularly fine degree of grinding on the one hand and effects an increased flow of the brewing water through the brewing chamber during the brewing and thus counteracts a clogging of the brewing chamber 36 (as mentioned in connection with FIG. 13). In the case of pulse pauses with a duration of less than 2 seconds, it is further possible to brew the ground material in spite of the fluctuations of the brewing water pressure, which appear in response to supplying the brewing water in pulses (FIGS. 14-17), in the case of a relatively large "averaged" pressure (according to an average value of the pressure of the brewing water in the brewing chamber 36, which is averaged over time). The latter is in particular relevant with regard to generating beverages, which require a brewing of the ground material at a relatively large pressure (e.g. in the case of espresso).

The invention claimed is:

1. A method for generating a coffee beverage in a brewing device (30) of an automatic coffee machine (10),
wherein the automatic coffee machine comprises:
a brewing chamber (36) for accommodating ground material, in particular ground coffee, wherein the brewing chamber (36) has a brewing water inlet (35) and a chamber outlet (37);
a pump for supplying pressurized brewing water to the brewing water inlet of the brewing chamber at a pressure;
a pump control device being connected via a control signal connection to the pump for controlling the pump by means of a signal being enabled to be generated by the pump control device for controlling the pump; and
at least one measuring device, which comprises at least one of a pressure measuring device or a flow meter, the pressure measuring device being designed to capture measuring values for the pressure of the brewing water supplied to the brewing water inlet at the brewing water inlet and the flow meter being designed to capture measuring values for a volume flow of the brewing water supplied to the brewing water inlet and/or measuring values for a volume flow of a liquid, which escapes from the chamber outlet, wherein the at least one measuring device is configured to supply captures measuring values to the pump control device, each one of the captured measuring values being one of a measuring value captured by the pressure measuring device for the pressure of the brewing water supplied to the brewing water inlet at the brewing water inlet or a measuring value captured by the flow meter for the volume flow of the brewing water supplied to the brewing chamber inlet or for the volume flow of a liquid, which escapes from the chamber outlet;
wherein the pump control device is configured to control the pump during a first supply time period and during a second time period, which follows the first supply time period, in such a way that the brewing water is enabled to be supplied to the brewing water inlet by means of the pump during the first supply time period according to a first brewing water supply mode and during the second supply time period according to a second brewing water supply mode;
wherein the pump is configured to be controlled by the pump control device in such a way that the pump continuously supplies the brewing water to the brewing water inlet in the first brewing water supply mode during the first supplying time period, and supplies the brewing water in the second brewing water supply mode during the second supply time period either in a continuous mode, in which the brewing water is continuously supplied to the brewing water inlet, or in a pulse mode, in which the brewing water is supplied in pulses at the brewing water inlet;
wherein the pump control device is configured to control the pump during the second supply time period as a function of at least one captured measuring value supplied by the measuring device in such a way that the pump (23) is enabled to supply the pressurized brewing water to the brewing water inlet as a function of the at least one captured measuring value either in the continuous mode or in the pulse mode according to one of the following cases e) to f):
e) if the at least one captured measuring value supplied by the measuring device is a measuring value captured by the pressure measuring device for the pressure of the brewing water supplied to the brewing water inlet at the brewing water inlet, the pressurized brewing water is supplied in the pulse mode, when the measuring value for the pressure is larger than a predetermined or predeterminable pressure threshold value, and in the continuous mode, when the measuring value for the pressure is smaller than a predetermined or predeterminable pressure threshold value;
f) if the at least one captured measuring value supplied by the measuring device is a measuring value captured by the flow meter for the volume flow of the brewing water supplied to the brewing chamber inlet or for the volume flow of the liquid, which escapes from the chamber outlet, the pressurized brewing water is supplied in the pulse mode, when the measuring value for the volume flow is smaller than a predetermined or predeterminable volume flow threshold value, and in the continuous mode, when the measuring value for the volume flow is larger than a predetermined or predeterminable volume flow threshold value;
wherein the method comprises the following method steps:
a) during the first supply time period (ΔT1): supplying pressurized brewing water at the brewing water inlet (35) according to the first brewing water supply mode, in which the brewing water is continuously supplied to the brewing water inlet (35);
b) during the second supply time period (ΔT2):
b1) determining a brewing water parameter, which correlates with the volume flow (Q, Q3) and/or with the pressure (P, P3) of the brewing water supplied to the brewing water inlet (35), and setting a mode setting parameter for a second brewing water supply mode, by using the brewing water parameter;
b2) supplying brewing water at the brewing water inlet (35) according to the second brewing water supply mode, wherein the mode setting parameter defines at least one continuous mode for the second brewing water supply mode, in which the brewing water is continuously supplied to the brewing water inlet (35), and a pulse mode for the second brewing water supply mode, in which the brewing water is supplied to the brewing water inlet (35) in pulses, and wherein the setting of the mode setting parameter for the second brewing water supply mode comprises at least one selection between the continuous mode for the second brewing water supply mode and the pulse mode for the second brewing water supply mode as a function of the brewing water parameter, wherein the at least one selection between the continuous mode for the second brewing water supply mode and the pulse mode for the second brewing water supply mode comprises at least one of the following steps c) to d):

c) measuring a pressure (P, P3) of the brewing water supplied to the brewing water inlet (35) at the brewing water inlet (35) and selecting the pulse mode or the continuous mode for the second brewing water supply mode as a function of the measured pressure (P, P3), wherein the pulse mode is selected, when the measured pressure (P, P3) at the brewing water inlet (35) exceeds a predetermined or predeterminable pressure threshold value (Pmax), and the continuous mode is selected, when the measured pressure (P, P3) at the brewing water inlet (35) falls below a predetermined or predeterminable pressure threshold value (Pmin); and/or d) measuring a volume flow (Q, Q3) of the brewing water supplied to the brewing water inlet (35) and/or of a volume flow of a liquid, which escapes from the chamber outlet (37), and selecting the pulse mode or the continuous mode for the second brewing water supply mode as a function of the measured volume flow (Q, Q3) of the brewing water supplied to the brewing chamber inlet (35) and/or the measured volume flow of the liquid, which escapes from the chamber outlet (37), wherein the pulse mode is selected, when the measured volume flow (Q, Q3) of the brewing water supplied to the brewing chamber inlet (35) and/or the measured volume flow of the liquid, which escapes from the chamber outlet, falls below or fall below, respectively, a predetermined or predeterminable volume flow threshold value (Qmin), and the continuous mode is selected, when the measured volume flow (Q) of the brewing water supplied to the brewing water inlet (35) and/or the measured volume flow of the liquid, which escapes from the chamber outlet (37), exceeds or exceed, respectively, a predetermined or predeterminable volume flow threshold value (Qmax).

2. The method according to claim 1,
wherein the method steps b1) to b2) are carried out repeatedly.

3. The method according to claim 2,
wherein the setting of the mode setting parameter for the second brewing water supply mode comprises a switch-over between the continuous mode for the second brewing water supply mode and the pulse mode for the second brewing water supply mode as a function of the measured pressure (P, P3) of the brewing water supplied to the brewing water inlet (35) and/or the measured volume flow (Q, Q3) of the brewing water supplied to the brewing chamber inlet (35) and/or the measured volume flow of the liquid, which escapes from the chamber outlet.

4. The method according to claim 1,
wherein a set degree of grinding of the ground material is included in the brewing water parameter.

5. The method according to claim 1,
wherein a set type of coffee beverage is included in the brewing water parameter.

6. The method according to claim 1,
wherein the mode setting parameter additionally defines pulse properties for the second brewing water supply mode, which include a pulse duty factor or a course of time of the pulse duty factor, and wherein the setting of the mode setting parameter comprises a setting of the pulse properties for the pulse mode.

7. The method according to claim 6, wherein one of the following courses of time is provided upon setting the pulse properties for the pulse mode:
progressive course of time of the pulse duty factor;
degressive course of time of the pulse duty factor;
progressive course of time of the pulse pause duration;
degressive course of time of the pulse pause duration;
progressive course of time of the pulse on-time;
degressive course of time of the pulse on-time;
progressive-degressive course of time of the pulse duty factor;
progressive-degressive course of time of the pulse pause duration;
degressive-progressive course of time of the pulse duty factor;
degressive-progressive course of time of the pulse pause duration.

8. An automatic coffee machine (10), wherein the automatic coffee machine (10) comprises:
a brewing chamber (36) for accommodating ground material, in particular ground coffee, wherein the brewing chamber (36) has a brewing water inlet (35) and a chamber outlet (37);
a pump (23), preferably a reciprocating plunger type pump, for supplying pressurized brewing water to the brewing water inlet (35) of the brewing chamber (36) at a pressure;
a pump control device (50-1) being connected via a control signal connection (LS) to the pump (5) for controlling the pump (23) by means of a signal (S1) being enabled to be generated by the pump control device; and
at least one measuring device, which comprises at least one of a pressure measuring device (51) or a flow meter (52), the pressure measuring device (51) being designed to capture measuring values for the pressure (P, P3) of the brewing water supplied to the brewing water inlet (35) at the brewing water inlet (35) and the flow meter (52) being designed to capture measuring values for a volume flow (Q, Q3) of the brewing water supplied to the brewing chamber inlet (35) and/or measuring values for a volume flow of a liquid, which escapes from the chamber outlet (37), wherein the at least one measuring device is configured to supply captured measuring values to the pump control device (50-1), each one of the captured measuring values being one of a measuring value captured by the pressure measuring device (51) for the pressure (P, P3) of the brewing water supplied to the brewing water inlet (35) at the brewing water inlet (35) or a measuring value captured by the flow meter (52) for the volume flow (Q, Q3) of the brewing water supplied to the brewing chamber inlet (35) or for the volume flow of a liquid, which escapes from the chamber outlet (37);

wherein the pump control device (50-1) is configured to control the pump (23) during a first supply time period (ΔT1) and during a second supply time period (ΔT2), which follows the first supply time period, in such a way that the brewing water is enabled to be supplied to the brewing water inlet (35) by means of the pump (23) during the first supply time period (ΔT1) according to a first brewing water supply mode and during the second supply time period (ΔT2) according to a second brewing water supply mode;

wherein the pump (23) is configured to be controlled by the pump control device (50-1) in such a way that the pump (23) continuously supplies the brewing water to the brewing water inlet (35) in the first brewing water supply mode during the first supplying time period (ΔT1), and supplies the brewing water in the second brewing water supply mode during the second supply time period (ΔT2) either in a continuous mode, in which the brewing water is continuously supplied to the brewing water inlet (35), or in a pulse mode, in which the brewing water is supplied in pulses at the brewing water inlet (35);

wherein the pump control device (50-1) is configured to control the pump (23) during the second supply time period (ΔT2) as a function of at least one captured measuring value supplied by the measuring device in such a way that the pump (23) is enabled to supply the pressurized brewing water to the brewing water inlet (35) as a function of the at least one captured measuring value either in the continuous mode or in the pulse mode according to one of the following cases e) to f):

e) if the at least one captured measuring value supplied by the measuring device is a measuring value captured by the pressure measuring device (51) for the pressure (P, P3) of the brewing water supplied to the brewing water inlet (35) at the brewing water inlet, the pressurized brewing water is supplied in the pulse mode, when the measuring value for the pressure (P, P3) is larger than a predetermined or predeterminable pressure threshold value (Pmax), and in the continuous mode, when the measuring value for the pressure (P, P3) is smaller than a predetermined or predeterminable pressure threshold value (Pmin);

f) if the at least one captured measuring value supplied by the measuring device is a measuring value captured by the flow meter (52) for the volume flow (Q, Q3) of the brewing water supplied to the brewing chamber inlet (35) or for the volume flow of the liquid, which escapes from the chamber outlet (37), the pressurized brewing water is supplied in the pulse mode, when the measuring value for the volume flow (Q, Q3) is smaller than a predetermined or predeterminable volume flow threshold value (Qmin), and in the continuous mode, when the measuring value for the volume flow (Q, Q3) is larger than a predetermined or predeterminable volume flow threshold value (Qmax).

9. The automatic coffee machine (10) according to claim 8, wherein
the pump control device (50-1) is configured to generate the signal for controlling the pump (23) as a pulse signal, which includes a plurality of consecutive pulses, wherein the pump (23) is turned on by controlling with one of the pulses, and is in each case turned off in a pulse pause between two consecutive pulses, in order to make it possible to supply the brewing water in the pulse mode.

10. The automatic coffee machine (10) according to claim 9, wherein
the pulse pause between two consecutive pulses has a duration of between 0.05 and 2 seconds.

11. The automatic coffee machine (10) according to claim 9, wherein the pulse signal has one of the following courses of time:
progressive course of time of the pulse duty factor;
degressive course of time of the pulse duty factor;
progressive course of time of the pulse pause duration;
degressive course of time of the pulse pause duration;
progressive course of time of the pulse on-time;
degressive course of time of the pulse on-time;
progressive-degressive course of time of the pulse duty factor;
progressive-degressive course of time of the pulse pause duration;
degressive-progressive course of time of the pulse duty factor;
degressive-progressive course of time of the pulse pause duration.

12. The automatic coffee machine (10) according to claim 8,
wherein the automatic coffee machine (10) includes a grinder, which is configured be adjusted manually or automatically with regard to the degree of grinding, and wherein provision is made for a degree of grinding sensor device, which is configured to supply the set degree of grinding to the pump control device (50-1).

* * * * *